(12) United States Patent
Luo et al.

(10) Patent No.: US 10,044,919 B2
(45) Date of Patent: Aug. 7, 2018

(54) STRUCTURES AND METHODS FOR CAPTURING IMAGES BY A PORTABLE ELECTRONIC DEVICE

(71) Applicants: Ning Luo, Fuzhou (CN); Huan Jian, Fuzhou (CN); Mingjun Jiang, Fuzhou (CN)

(72) Inventors: Ning Luo, Fuzhou (CN); Huan Jian, Fuzhou (CN); Mingjun Jiang, Fuzhou (CN)

(73) Assignee: Fuzhou Rockchips Electronics Co., Ltd., Fuzhou, Fujian (CN)

(*) Notice: Subject to any disclaimer, the term of this patent is extended or adjusted under 35 U.S.C. 154(b) by 0 days.

(21) Appl. No.: 15/044,082

(22) Filed: Feb. 15, 2016

(65) Prior Publication Data

US 2016/0241764 A1 Aug. 18, 2016

(30) Foreign Application Priority Data

Feb. 13, 2015 (CN) .......................... 2015 1 0078505

(51) Int. Cl.
*G02B 13/16* (2006.01)
*H04N 5/225* (2006.01)
*G03B 17/17* (2006.01)

(52) U.S. Cl.
CPC ........... *H04N 5/2259* (2013.01); *G03B 17/17* (2013.01); *H04N 5/2254* (2013.01); *H04N 5/2257* (2013.01); *H04N 5/2258* (2013.01)

(58) Field of Classification Search
CPC .. H04N 5/2259; H04N 5/2258; H04N 5/2257; H04N 5/2254; G03B 17/17
USPC ................ 348/335, 340, 345, 348, 350, 352
See application file for complete search history.

(56) References Cited

U.S. PATENT DOCUMENTS

| | | | |
|---|---|---|---|
| 4,803,694 A * | 2/1989 | Lee ........................ | H01S 3/0805 372/101 |
| 9,036,153 B1 * | 5/2015 | Gupta .................... | G01N 21/55 356/237.2 |
| 2009/0067051 A1 * | 3/2009 | Cho .................... | G02B 26/0883 359/554 |
| 2014/0218587 A1 * | 8/2014 | Shah ........................ | G03B 5/00 348/340 |

* cited by examiner

*Primary Examiner* — Yogesh Aggarwal

(57) ABSTRACT

An imaging structure for a portable electronic device is disclosed. The imaging structure may include a housing having an opening for obtaining external light. The imaging structure may also include a reflective module coupled with the housing. The reflective module may include a reflective surface for reflecting the external light. The imaging structure may further include a photo-sensing module coupled with the reflective module. The photo-sensing module may be configured to generate an image based on the external light reflected from the reflective module toward the photo-sensing module.

6 Claims, 20 Drawing Sheets

STRUCTURES AND METHODS FOR CAPTURING IMAGES BY A PORTABLE ELECTRONIC DEVICE

CROSS-REFERENCE

This application is a US non-provisional application claiming priority to a Chinese Patent Application No. 201510078505.4, filed on Feb. 13, 2015, which is hereby incorporated by reference in its entirety, including any appendices or attachments thereof, for all purposes.

TECHNICAL FIELD

The present disclosure is related to imaging structures suitable to be installed in portable electronic devices, and methods to utilize the imaging structures to capture images.

BACKGROUND

Today's portable electronic devices, such as smartphones, tablets, or wearable electronic devices, are commonly equipped with camera modules, which contain compatible hardware and software modules that allow the portable electronic devices to take photos and videos. As technologies (e.g., pixel resolutions) associated with these camera modules are getting more advanced, consumers' demands for better image qualities in terms of e.g., clarity, color, distortion, are also getting higher. For example, there are increasing demands for camera modules of the portable electronic devices to support optical zooming, telephoto, and/or wide-angle photo capturing capabilities.

However, due to certain restrictions in size, weight, and particularly thickness, any design for camera modules used in portable electronic devices will have trade-offs between structure and performance. As a result, many portable electronic devices are limited in adapting the capturing features and video recording functions the consumers are demanding. And it is equally hard to have breakthroughs in structure as well as in image capturing methods especially for the camera modules used in the portable electronic devices. Thus, novel imaging structures for portable electronic devices, as well as the associated methods for capturing images using the imaging structures, are needed.

Figure 1:
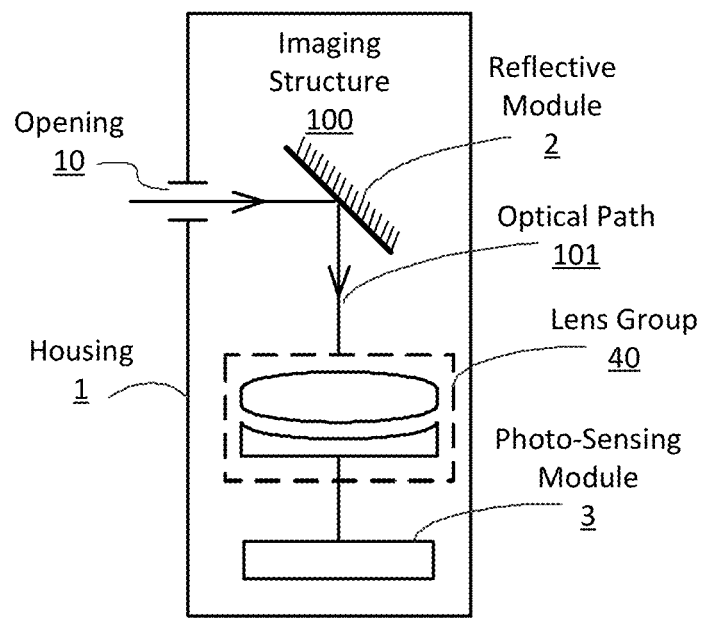
FIG. 1 shows a diagram illustrating an imaging structure suitable for a portable electronic device.

all arranged in accordance to at least one or more embodiments of the present disclosure.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

The present disclosure provides multiple embodiments of imaging structures that are suitable for portable electronic devices, as well as some embodiments of portable electronic devices that are configured with these imaging structures. The "portable electronic device" described herein may include any electronic devices that are easily carry-able by humans, and typically includes mobile phone, tablet, laptop, or any wearable electronic device. The "wearable electronic device" may include smart watches, smart wristbands, smart glasses, etc.

Throughout the disclosure, the term "imaging", shooting, or photography, may refer to any process to capture one or more graphic images using light-sensing equipment, including any process to store the captured graphic images using image-recording equipment. The term "imaging structure" may refer to any apparatus or physical structure configured to take still or motion pictures, to be implemented in a portable electronic device, or to replace any existing camera structure such as the ones on smartphones or laptops. Accordingly, an imaging structure may also be referred to as a camera module.

FIG. 1 shows a diagram illustrating an imaging structure suitable for a portable electronic device, in according to certain embodiments of the present disclosure. In FIG. 1, an imaging structure 100 may include, among other components, a housing 1, a reflective module 2, and a photo-sensing module 3. The housing 1 may be a structure to hold together all physical components of the imaging structure 100. The reflective module 2 may contain a reflective surface for manipulating light's traveling behavior. For example, the reflective module 2 may have a reflective surface being a mirror or a prism. The mirror may be any total-reflective or semi-reflective mirror. The photo-sensing module 3 may be any electronic component that can sense light and convert light to digital signals, and may be one of the Charge-coupled Device (CCD) sensors, Complementary Metal Oxide Semiconductor (CMOS) sensors, etc.

In some embodiments, the housing 1 of the imaging structure 100 may have an opening 10 allowing external light to pass through and enter the imaging structure 100. The opening 10 may be an empty space with a circular shape, and surrounded by materials from the housing 1. A portable electronic device may have more spaces in its front and back surfaces, while in comparison, its top, bottom, and two sides are smaller and narrower due to device thickness concerns. The imaging structure 100 may most likely be installed in the portable electronic device so that the opening 10 of the imaging structure 100 may be positioned on any surface or side of the portable electronic device with sufficient space (e.g., on the front or back), as long as the device thickness requirement and device performance requirement are satisfied.

In other words, the axial direction of the opening 10 needs to be the same as the extending direction of the side of the portable electronic device that has the smallest length. Or the axial direction of the opening 10 may be aligned with the "thickness" direction of the portable electronic device. For example, for a portable electronic device that is a mobile phone, the opening 10 may typically be placed on the mobile phone's front or back surface. Since the front of the mobile phone may be equipped with a display screen and facing a user, the opening 10 may be on a front-facing camera module facing the front of the mobile phone. Similarly, the opening 10 may be on a back-facing camera module facing the back of the mobile phone.

In some embodiments, the opening 10, the reflective module 2 and the photo-sensing module 3 may be placed sequentially along an optical path 101 formed by external light traveling inside of the imaging structure 100. Throughout the disclosure, an "optical path" may refer to a path traveled by external light entering from the opening 10, traversing through multiple modules, and finally reaching the photo-sensing module 3. In various embodiments, along the optical path between the opening 10 and the reflective module 2, or along the optical path between the reflective module 2 and the photo-sensing module 3, additional modules or optical parts, such as "reflection part" to achieve light reflection or "refraction part" to achieve light refraction, may be placed in according to different design requirements. For example, 2 or more optical parts may be placed along the optical path 101 to allow the light traveling direction being changed 2 or more times.

In some embodiments, to capture outside scenery as a focused image at the photo-sensing module 3, one approach is to use a concave reflective mirror as the reflective surface of the reflective module 2. Other approaches may include placing a focusing lens on the optical path 101, and letting light being refracted through the focusing lens and onto the photo-sensing module 3. A lens may be defined as a transparent object having two or more refraction surfaces for refracting entering or exiting lights. The refraction surfaces may be spherical, or may be in any curved shapes. The lens may be made of glass or any other transparent materials.

In some embodiments, in order to allow the lens to have better focusing effect (e.g., reducing chromatic aberration or distortion), 2 or more lenses may be integrated into a lens group (e.g., lens group 40 in FIG. 1) and placed on/along the optical path 101. A lens group 40 may be a focus lens group to achieve focusing effect (or a zooming lens group to achieve zooming effect) by having a moving mechanism to adjust the lenses contained therein. "Focusing" may refer to the process of adjusting the lens or lens group 40, to allow the subject being photographed becoming clear and in focus at the photo-sensing module 3. "Zooming" may refer to a process of adjusting the lens or lens group 40, to change the focal length of the entire lens or lens group 40.

In some embodiments, one or more lenses or lens groups may be placed between a curved mirror and the photo-sensing module 3, or be placed on/along the optical path 101 from the opening 10 to the photo-sensing module 3. In FIG. 1's example, in order to reduce the thickness of the portable electronic device, no lens or lens group is placed between the opening 10 and the reflective module 2. Rather, a lens group 40 is placed sideway between the reflective module 2 and the photo-sensing module 3. To further simplify design and increase versatility, the lens group 40 and the photo-sensing module 3 may be integrated as a single "photo-sensing unit."

In some embodiments, in order to provide a zooming function to the imaging structure 100, the lens group 40 may be a zooming lens group. A zooming lens group may have at least a front lens and a rear lens separated by a certain distance, and the distance between the front lens and rear lens can be adjusted during telescopic change. Conventional telescopic camera module may face its zooming lens group toward either the front surface or the back surface of the portable electronic device, which may either greatly increase the portable electronic device's thickness due to the above distance requirement, or force the camera module to extend out of the portable electronic device's surfaces, all of which may greatly affect the portable electronic device's appearance, use-ability, and carrying convenience.

In some embodiments, with the help of the reflective module 2's reflection and/or deflection, the angle of the optical path 101 may be rotated 90 degrees. As a result, the zooming lens group 40 may be placed sideway along the optical path 101 between the reflective module 2 and the photo-sensing module 3, and the optical path of the zooming lens group 40 becomes parallel to the front or back surface of the portable electronic device. Such an approach provides more spaces for the zooming lens group 40, allows more flexibility in adjusting the distance between the front lens and rear lens of the zooming lens group 40, without affecting the thickness of the portable electronic device.

In some embodiments, to further extend the capabilities of the imaging structure 100, the reflective module 2 may contain a curved mirror as its reflection surface. The curved mirror, which may provide a curved reflection effect, has less dispersion comparing to lens, and can produce better image capturing capabilities and image acquisition outcomes. In some embodiments, the curved mirror may have a plane-curved surface or a spherical-curved surface. Mathematically, a curved surface may be formed using the tracks formed by a line moving continuously in a space. Based on the shape of the line, the curved surface may be a plane-curved surface (which is formed by the curving movement of a straight line), or a spherical-curved surface (which is formed by the movement of a non-straight line).

For example, a cylindrical surface may be a plane-curved surface, as it is generated by a straight line (or a segment of the straight line) rotating around an axis which is parallel to the straight line. In other words, a plane-curved surface may have a straight and non-curving direction. In comparison, a conic surface is a spherical-curved surface. Same as paraboloid, which has a spherical-curved surface formed by rotating a parabola line around the parabola's axis; or hyperbolic hyperboloid surface, a spherical-curved surface formed by hyperbola line rotating around the hyperbola's axis; or oval-shaped surface, a spherical-curved surface formed by an ellipse line rotating around its axis.

Figure 2:
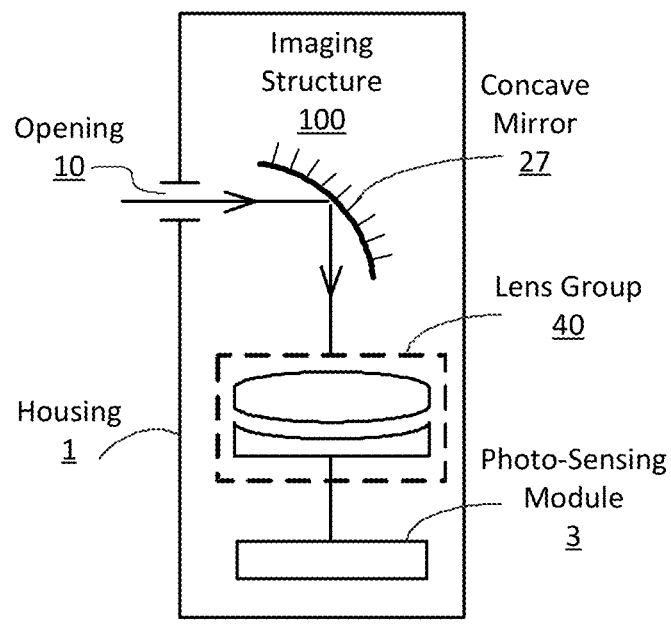
FIG. 2 shows a diagram illustrating an imaging structure configured with a concave mirror as part of its reflective module.

FIG. 2 shows a diagram illustrating an imaging structure configured with a concave mirror as part of its reflective module, in according to certain embodiments of the present disclosure. In FIG. 2, the imaging structure 100 may have a concave mirror 27 as part of its reflective module 2. The concave mirror 27 may have a curved surface. When a lens group 40 is placed between the concave mirror 27 and the photo-sensing module 3, the reflection effect generated by the curved surface of the concave mirror 27 is equivalent to the increasing of the focal length of an imaging structure having a flat mirror as part of its reflective module 2. In other words, this imaging structure 100 having a concave mirror can create a telephoto lens effect of extending the focal length of a flat mirror imaging structure. Since an optical telephoto lens requires lens manufactured by high precision machinery, the imaging structure 100 may use the concave mirror 27 instead of the optical telephoto lens, in order to reduce costs while achieving a similar telephoto effect.

Figure 31:
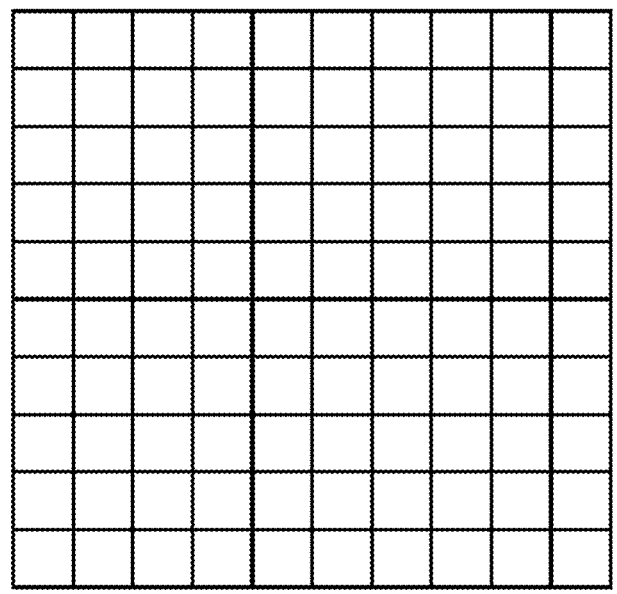
FIG. 31 illustrates an exemplary graphic scene.

FIG. 31 illustrates an exemplary graphic scene, which is a square grid formed by 10 by 10 squares. Each square in FIG. 31 may have a uniform length. In other words, the image in FIG. 31 may represent a shooting object from which images may be captured.

Figure 32:
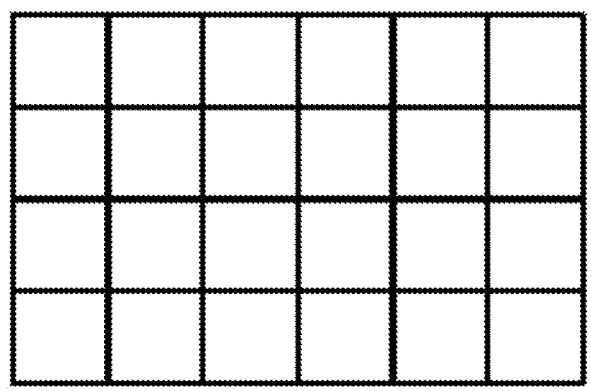
FIG. 32 illustrates an exemplary image captured by an imaging structure having a flat mirror as part of its reflective module.

FIG. 32 illustrates an exemplary image captured by an imaging structure having a flat mirror as its reflective module. The image in FIG. 32 may be a grid formed by 6 by 4 squares. In some embodiments, the image in FIG. 32 may be generated by the imaging structure 100 of FIG. 1, capturing 6 by 4 squares of the graphic scene as shown in FIG. 31.

Figure 33:
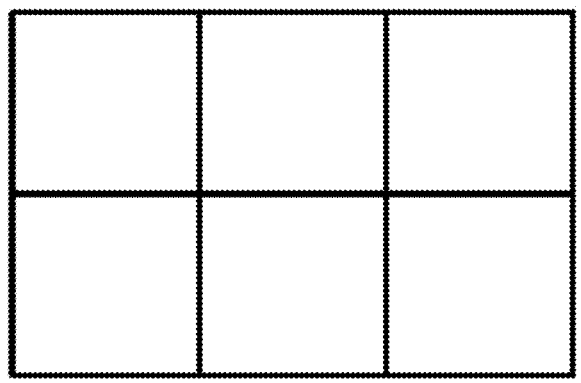
FIG. 33 illustrates an exemplary image captured by an imaging structure which is constructed by replacing the flat mirror of the imaging structure used to capture FIG. 32's image, with a concave mirror as part of its reflective module.

FIG. 33 illustrates an exemplary image captured by an imaging structure which is constructed by replacing the flat mirror of the imaging structure used to capture FIG. 32's image, with a concave mirror as its reflective module 2. In some embodiments, the image in FIG. 33 may be generated by the imaging structure 100 of FIG. 2, capturing 3 by 2 squares of the graphic scene as shown in FIG. 31. As illustrated by FIG. 33, the imaging structure 100 of FIG. 2 can achieve a telephoto camera shooting effect in comparison to the imaging structure 100 of FIG. 1, which is used for capturing FIG. 32's image.

Returning back to FIG. 2, in some embodiments, the concave mirror 27 may have a spherical-curved reflective surface, such as spherical, paraboloid, or hyperboloid surface. Alternatively, the concave mirror 27 may have a plane-curved reflective surface, such as a cylindrical reflective surface. The effect generated by such plane-curved reflective surface may be an image having stretches in certain direction and no-stretch in other directions. For example, a concave mirror 27 having a cylindrical reflective surface may generate an image that has normal proportion in the direction that is parallel to the cylindrical surface's straight lines, while all other directions on the image may be stretched.

Figure 34:
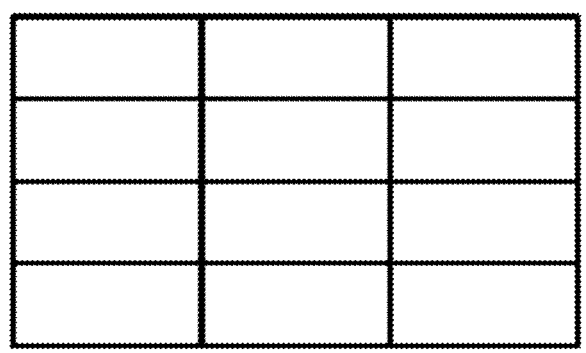
FIG. 34 illustrates an exemplary image captured by an imaging structure having a concave mirror with a plane-curved reflective surface.

FIG. 34 illustrates an exemplary image captured by an imaging structure having a concave mirror with a plane-curved reflective surface, in according to certain embodiments of the present disclosure. The image in FIG. 34 may be generated based on an imaging structure having a concave mirror, capturing 3 by 4 squares of the graphic scene as shown in FIG. 31. The concave mirror may have a cylindrical reflective surface with its vertical direction being straight. As a result, the image in FIG. 34 may have stretches in horizontal (lateral) direction, while retaining its original proportion in vertical (longitudinal) direction.

Figure 36:
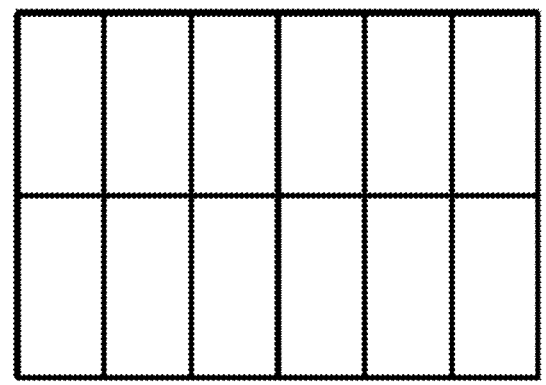
FIG. 36 illustrates another exemplary image captured by an imaging structure having a concave mirror with a plane-curved reflective surface.

FIG. 36 illustrates another exemplary image captured by an imaging structure having a concave mirror with a plane-curved reflective surface, in according to certain embodiments of the present disclosure. The image in FIG. 36 may be generated based on an imaging structure having a concave mirror, capturing 6 by 2 squares of the graphic scene as shown in FIG. 31. The concave mirror may have a cylindrical surface with its horizontal direction being straight. As a result, the image in FIG. 34 may have stretches in vertical (longitudinal) direction, while retaining its original proportion in horizontal (lateral) direction.

Figure 3:
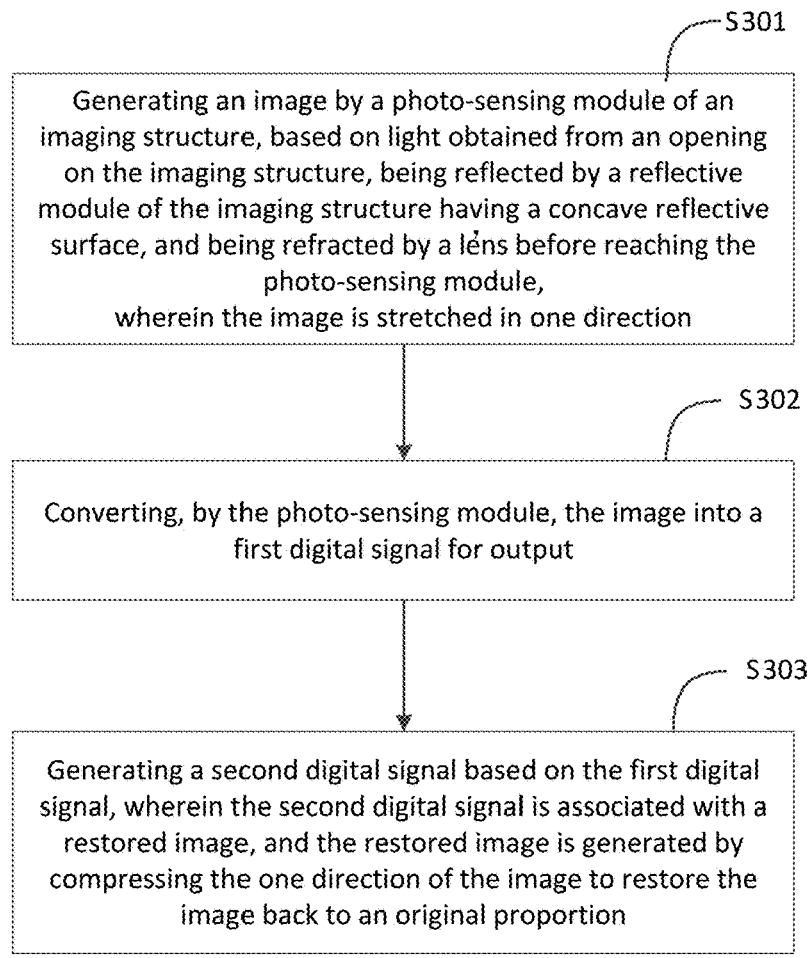
FIG. 3 shows a flow diagram illustrating one example process for capturing images by an imaging structure having a concave reflective module.

FIG. 3 shows a flow diagram illustrating one example process for capturing images by an imaging structure having a concave reflective module, in accordance to certain embodiments of the present disclosure. The process sets forth various functional blocks or actions (as shown in e.g., S301, S302, and S303) that may be described as processing steps, functional operations, events, and/or acts, which may be performed by hardware, software, and/or firmware. Those skilled in the art in light of the present disclosure will recognize that numerous alternatives to the functional blocks shown in FIG. 3 may be practiced in various implementations.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

At block S301, an imaging structure may capture/obtain external light via an opening on a portable electronic device. The light entering via the opening may be reflected by the imaging structure's reflective module, be refracted by a lens or lens group of the imaging structure, before being focused as a distorted image on a photo-sensing module of the imaging structure. The reflective module may contain a concave mirror having a plane-curved reflective surface, which may stretch the image at a certain direction, as illustrated by FIG. 34 or FIG. 36.

At block S302, the photo-sensing module of the imaging structure may convert the distorted image being focused onto it to a first digital signal for outputs.

At block S303, a post-processing module of the imaging structure (or a post-processing module of the portable electronic device) may generate a second digital signal based on the first digital signal. The second digital signal may correspond to a restored image, which is restored based on the distorted image. Specifically, the post-processing module may identify the stretch direction in the distorted image as well as its stretch ratio, and restore the stretches in the distorted image by compressing the distorted image in its stretch direction, thereby returning the distorted image back to its intended proportion. The result of the restoring may be saved as the restored image.

Figure 35:
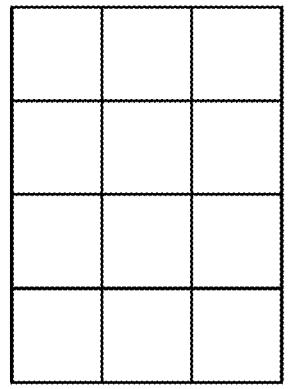
FIG. 35 illustrates an exemplary image restored from a stretched image.

FIG. 35 illustrates an exemplary image restored from a stretched image, in according to certain embodiments of the present disclosure. The image in FIG. 35 may be generated based on a stretched image, such as the image shown in FIG. 34. After restoration by the above S303 operation, the image in FIG. 35 may no longer have stretches in horizontal (lateral) direction, while its vertical (longitudinal) direction remain in its original proportion.

Figure 37:
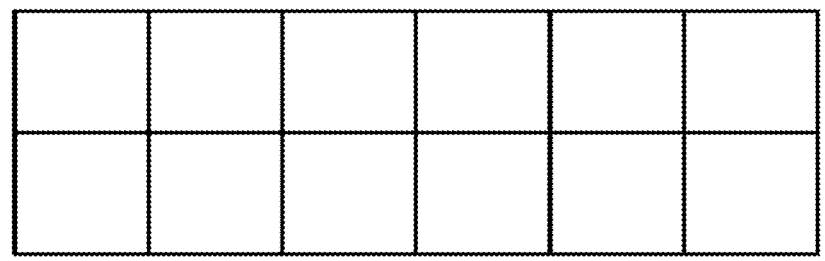
FIG. 37 illustrates another exemplary image restored from a stretched image.

FIG. 37 illustrates another exemplary image restored from a stretched image, in according to certain embodiments of the present disclosure. The image in FIG. 37 may be generated based on a stretched image, such as the image shown in FIG. 36. After restoration by the above S303 operation, the image in FIG. 37 may no longer have stretches in vertical (longitudinal) direction, while its horizontal (lateral) direction remain in its original proportion.

Referring back to FIG. 3, In order to match user's viewing habits, common aspect ratios for images or videos are often associated with rectangular shapes, such as 4:3, 3:2, 16:10, 21:9, etc. Photo-sensing modules may also have similar shaped photo-sensing regions (square shape or rectangle shape with different width and length). Still, images being focused onto a photo-sensing module may tend to have a circular shaped image field. The term "image field" may refer to a well-exposed and focused field on a focal plane, after light from a shooting object has been converged by a lens or lens group onto the focal plane. Since for a circular image field, the distance from the center of the image field has a negative correlation with the image quality. That is, the greater the distance between a pixel and the center of the image field, the worse the image quality this pixel may have. Thus, photo-sensing region of a photo-sensing module should have a length-to-width aspect ratio closer to 1:1, in order to achieve a preferred image quality.

Figure 4:
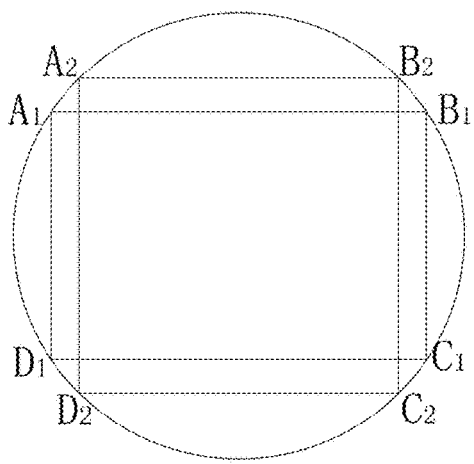
FIG. 4 illustrates multiple photo-sensing regions associated with an image field.

FIG. 4 illustrates multiple photo-sensing regions associated with an image field. In FIG. 4, the circle may represent an image field covering a rectangular A1B1C1D1 and a square A2B2C2D2. The rectangular A1B1C1D1 may be a photo-sensing region having a 3:2 aspect ratio. The square A2B2C2D2 may be a photo-sensing region having a 1:1 aspect ratio. Assuming the radius of the image field is 1, the rectangular A1B1C1D1 may have an area value of 1.846, while the square A2B2C2D2 may have an area value of 2. Thus, a photo-sensing region having an aspect ratio of 1:1 can cover a larger portion of the image field, thereby increasing the performance potential of a photo-sensing module.

As described above, a concave mirror 27 having a cylindrical reflective surface may generate an image that has stretches in certain direction, which may be converted into a restored image having stretched direction being compressed. The restored image may have a 1:1 aspect ratio. When the stretched image is generated by a rectangular photo-sensing region, by performing the above post-processing, the restored image may be deemed as if being generated by a photo-sensing region having a 1:1 aspect ratio. Thus, the concave mirror 27 of FIG. 2 may greatly enhance the effectiveness of the image field for the photo-sensing module.

Figure 5:
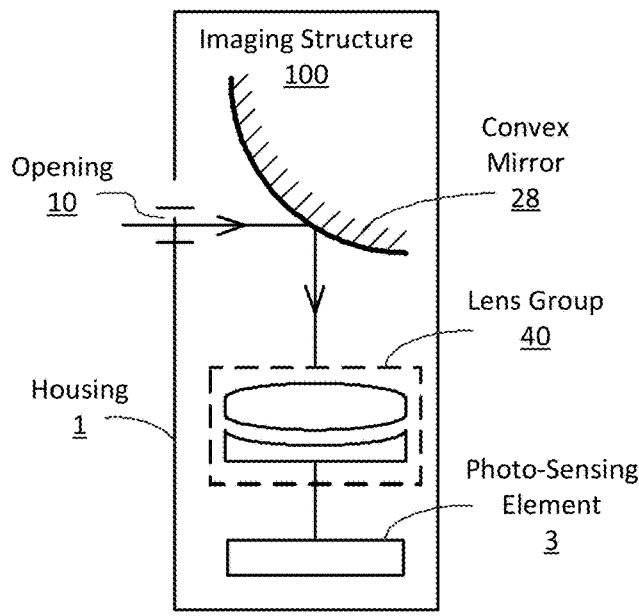
FIG. 5 shows a diagram illustrating an imaging structure configured with a convex mirror as part of its reflective module.

FIG. 5 shows a diagram illustrating an imaging structure configured with a convex mirror as part of its reflective module, in according to certain embodiments of the present disclosure. In FIG. 5, the imaging structure 100 may have a convex mirror 28 as part of its reflective module 2. The convex mirror 28 may have curved surface. When a lens group 40 is placed between the convex mirror 28 and the photo-sensing module 3, the reflection effect generated by the curved surface of the convex mirror 28 is similar to the shortening of the focal length of an imaging structure having a flat mirror acting as its reflective module 2. In other words, this imaging structure 100 having a convex mirror 28 can create a wide-angle lens effect.

Figure 38:
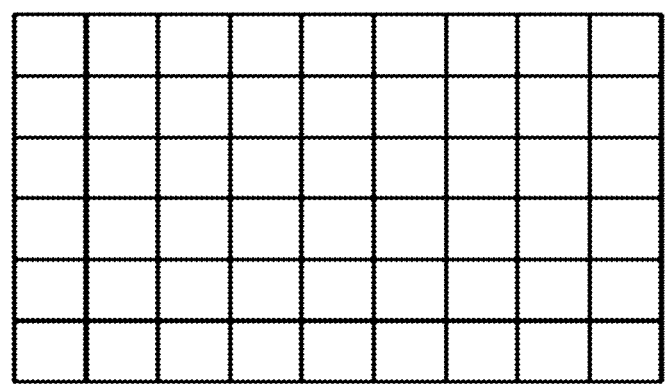
FIG. 38 illustrates an exemplary image captured by an imaging structure which is constructed by replacing the flat mirror with a convex mirror as part of its reflective module.

FIG. 38 illustrates an exemplary image captured by an imaging structure which is constructed by replacing the flat mirror of the imaging structure used to capture FIG. 32's image, with a convex mirror as its reflective module 2. In some embodiments, the image in FIG. 38 may be generated by the imaging structure 100 of FIG. 5, capturing 9 by 6 squares of the graphic scene as shown in FIG. 31. As illustrated by FIG. 38, the imaging structure 100 of FIG. 5 can achieve a wide-angle camera shooting effect in comparison to the imaging structure 100 of FIG. 1, which is used for capturing FIG. 32's image.

Returning back to FIG. 5, in some embodiments, the convex mirror 28 may have a spherical-curved reflective surface or a plane-curved reflective surface. The effect generated by such plane-curved reflective surface may be an image having compression in certain direction and no-compression in other directions. For example, a convex mirror 28 having a cylindrical reflective surface may generate an image that has normal proportion in the direction that is parallel to the cylindrical reflective surface's straight direction, while all other directions on the image may be compressed.

Figure 39:
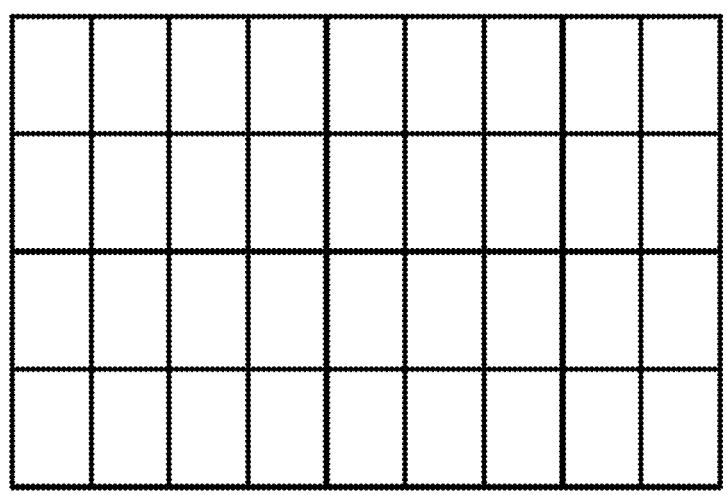
FIG. 39 illustrates an exemplary image captured by an imaging structure having a convex mirror with a plane-curved reflective surface.

FIG. 39 illustrates an exemplary image captured by an imaging structure having a convex mirror with a plane-curved reflective surface, in according to certain embodiments of the present disclosure. The image in FIG. 39 may be generated based on an imaging structure having a convex mirror, capturing 9 by 4 squares of the graphic scene as shown in FIG. 31. The convex mirror may have a cylindrical reflective surface with its vertical direction being straight. As a result, the image in FIG. 39 may have compressions in horizontal (lateral) direction, while retaining its original proportion in vertical (longitudinal) direction.

Figure 41:
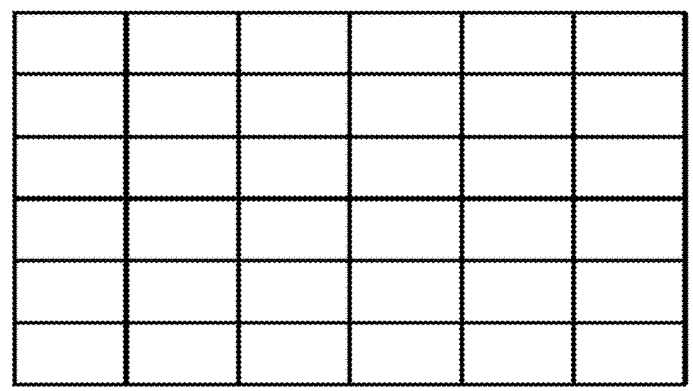
FIG. 41 illustrates another exemplary image captured by an imaging structure having a convex mirror with a plane-curved reflective surface.

FIG. 41 illustrates another exemplary image captured by an imaging structure having a convex mirror with a plane-curved reflective surface, in according to certain embodiments of the present disclosure. The image in FIG. 41 may be generated based on an imaging structure having a convex mirror, capturing 6 by 6 squares of the graphic scene as shown in FIG. 31. The convex mirror may have a cylindrical reflective surface with its horizontal direction being straight. As a result, the image in FIG. 41 may have compressions in vertical (longitudinal) direction, while retaining its original proportion in horizontal (lateral) direction.

Figure 6:
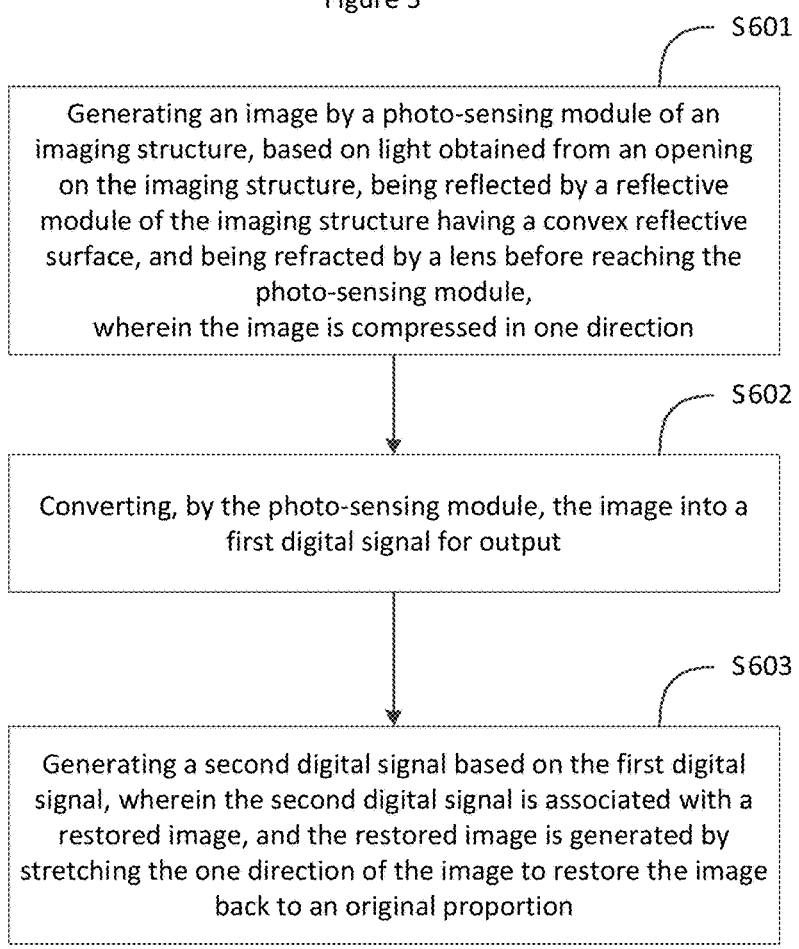
FIG. 6 shows a flow diagram illustrating one example process for capturing images by an imaging structure having a convex reflective module.

FIG. 6 shows a flow diagram illustrating one example process for capturing images by an imaging structure having a convex reflective module, in accordance to certain embodiments of the present disclosure. The process sets forth various functional blocks or actions (as shown in e.g., S601, S602, and S603) that may be described as processing steps, functional operations, events, and/or acts, which may be performed by hardware, software, and/or firmware. Those skilled in the art in light of the present disclosure will recognize that numerous alternatives to the functional blocks shown in FIG. 3 may be practiced in various implementations.

At block S601, an imaging structure may capture light via an opening on a portable electronic device. The light entering via the opening may be reflected by the imaging structure's reflective module, be refracted by a lens or lens group of the imaging structure, before being focused as a distorted image on the photo-sensing module of the imaging structure. The reflective module may have a convex mirror with a plane-curved reflective surface, which may compress the image at a certain direction, as illustrated by FIG. 39 or FIG. 41.

At block S602, the photo-sensing module of the imaging structure may convert the distorted image being focused onto it to a first digital signal for outputs.

At block S603, a post-processing module of the imaging structure (or a post-processing module of the portable electronic device) may generate a second digital signal based on the first digital signal. The second digital signal may correspond to a restored image, which is generated based on the distorted image. Specifically, the post-processing module may identify the compression direction in the distorted image as well as its compression ratio, and restore the compressions in the distorted image by stretching the distorted image in its compression direction, thereby restoring the distorted image back to its intended proportion. The result of the restoring may be saved as the restored image.

Figure 40:
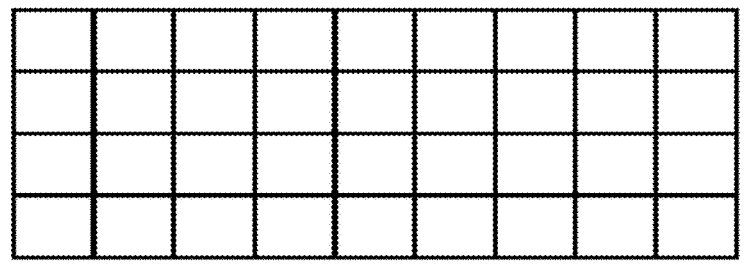
FIG. 40 may show a restored image based on the stretched image.
Figure 42:
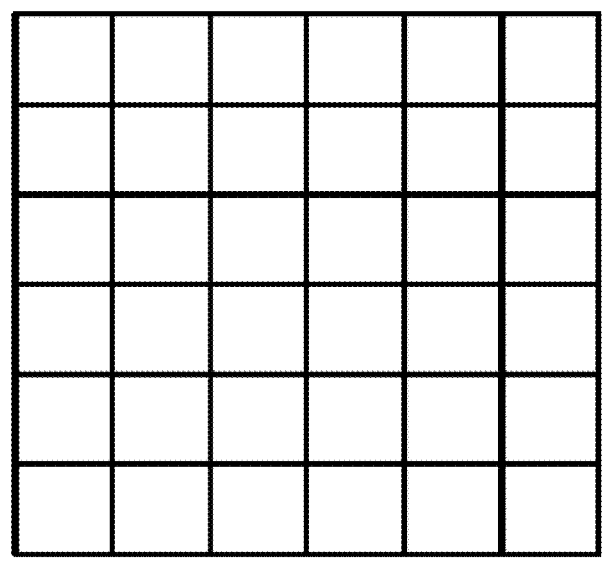
FIG. 42 may show a restored image based on the compressed image.

As described above, photo-sensing region of a photo-sensing module should have a length-to-width aspect ratio closer to 1:1, in order to achieve a better image quality. A convex mirror having a cylindrical reflective surface may generate an image that has compressions in certain direction, which may be converted into a restored image having compressed direction being stretched. The restored image may have a 1:1 aspect ratio. Since the compressed image may be generated by a rectangular photo-sensing region, by performing the above post-processing, the restored image may be deemed as if being generated by a photo-sensing region that is larger than the rectangular photo-sensing region in the photo-sensing module, thereby greatly enhanced the effectiveness of the image field generated by the above photo-sensing module. FIG. 40 may show a restored image based on the stretched image in FIG. 39. And FIG. 42 may show a restored image based on the compressed image in FIG. 41.

Figure 7:
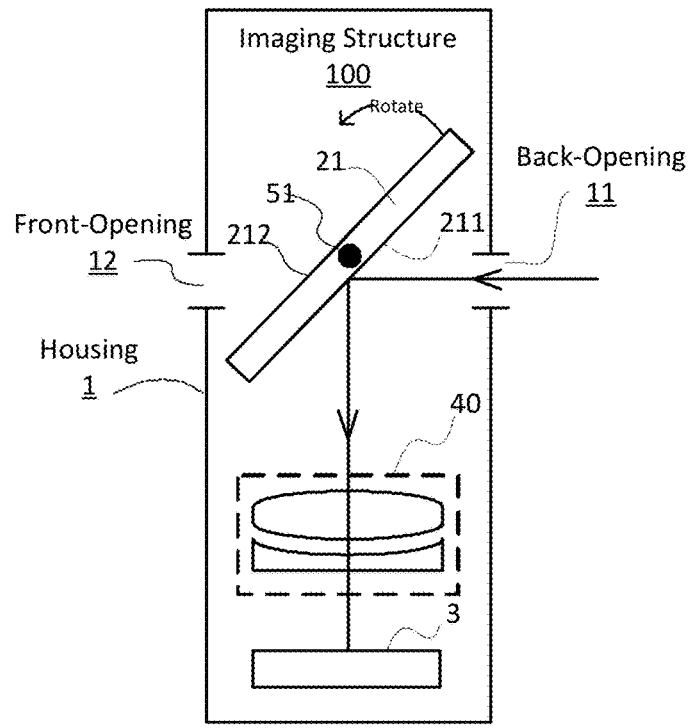
FIG. 7 shows a diagram illustrating an imaging structure configured with a double-reflective rotating module.

FIG. 7 shows a diagram illustrating an imaging structure configured with a double-reflective rotating module, in according to certain embodiments of the present disclosure. In FIG. 7, a portable electronic device may be implemented with an imaging structure 100 configured for better utilization of its lens group 40 and photo-sensing module 3. The imaging structure 100 may have a back-opening 11 and a front-opening 12 for light inlet. The back-opening 11 and the front-opening 12 may be placed in accordance to the back-opening and front-opening of the portable electronic device. In order words, the portable electronic device may have an opening on its back surface (case-back-opening) that corresponds to the imaging structure 100's back-opening 11. At a position on its front surface that is directly opposite to the case-back-opening, the portable electronic device may have an opening (case-front-opening) that corresponds to the imaging structure 100's front-opening 12. The back-opening 11 and the front-opening 12 may be placed opposite to each other and on the same horizontal or vertical level or on different levels or positions.

Figure 8:
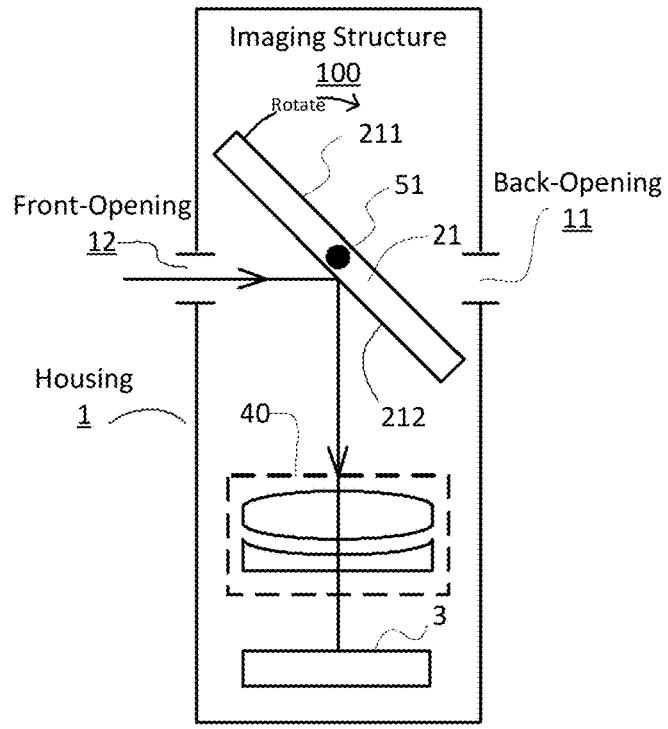
FIG. 8 shows a diagram illustrating an imaging structure after its double-reflective rotating module is rotated.

In some embodiments, the imaging structure 100 may be equipped with a double-reflective mirror 21 placed in between the back-opening 11 and the front-opening 12. The double-reflective mirror 21 may be a reflective module having two reflective surfaces placed on both of its sides (as illustrated in FIG. 7 and FIG. 8 by the first reflective surface 211 and the second reflective surface 212) for reflecting different lights. The imaging structure 100 may further be equipped with a rotating mechanism, with its rotation axis being placed in the middle of the double-reflective mirror 21 and parallel to the reflective surfaces 211 and 212. The rotating mechanism may be any mechanical structure which enables the double-reflective mirror 21 to rotate around the rotation axis. For example, the rotating mechanism may include a rotation shaft 51 placed in the middle of the double-reflective mirror 21 along with the rotation axis. The rotating mechanism may adjust the rotation shaft 51, causing the double-reflective mirror 21 to rotate or flip back-or-forth.

In a scenario as illustrated by FIG. 7, the first reflective surface 211 of the double-reflective mirror 21 may face toward the back-opening 11, allowing light entering via the back-opening 11 to be reflected and travel on a reflected optical path that is perpendicular to the entering light. The reflected light then passes through the lens group 40 before forming a focused image at the photo-sensing module 3. In this scenario, the image is captured from the back of the portable electronic device via the back-opening 11. To capture image from the front of the portable electronic device via the front-opening 12, the imaging structure 100 may adjust the rotation shaft 51, and turn the double-reflective mirror 21 90-degree left along the curved arrow indicated in FIG. 7, the result of which may be illustrated in FIG. 8.

FIG. 8 shows a diagram illustrating an imaging structure after its double-reflective rotating module is rotated, in according to certain embodiments of the present disclosure. The imaging structure 100's double-reflective mirror 21 is rotated from a first position as illustrated in FIG. 7 to a second position as illustrated in FIG. 8. In FIG. 8's scenario, the second reflective surface 212 of the double-reflective mirror 21 may face toward the front-opening 12, allowing light entering via the front-opening 12 to be reflected and travel on a reflected optical path that is perpendicular to the entering light. The reflected light then passes through the lens group 40 before forming a focused image at the photo-sensing module 3. In this scenario, the image is captured from the front of the portable electronic device via the front-opening 12. To return to the capturing of image from the back of the portable electronic device via the back-opening 11, the imaging structure 100 may adjust the rotation shaft 51, and turn the double-reflective mirror 21 90-degree right along the curved arrow indicated in FIG. 8, the result of which may be illustrated in FIG. 7.

In some embodiments, the double-reflective mirror 21 may be rotated back-and-forth between the two incoming lights from the back-opening 11 and the front-opening 12. During such rotation, the reflective surfaces of the double-reflective mirror 21 will not "cut across" the two incoming lights. In other words, the double-reflective mirror 21 will not rotate to a point that becomes parallel to the incoming lights. The reflective surface 211 may only be used for reflecting lights entering via the back-opening 11, not for reflecting lights entering via the front-opening 12. Similarly, the reflective surface 212 may only be used to reflect lights entering via the front-opening 12, not to reflect lights entering via the back-opening 11.

Figure 9:
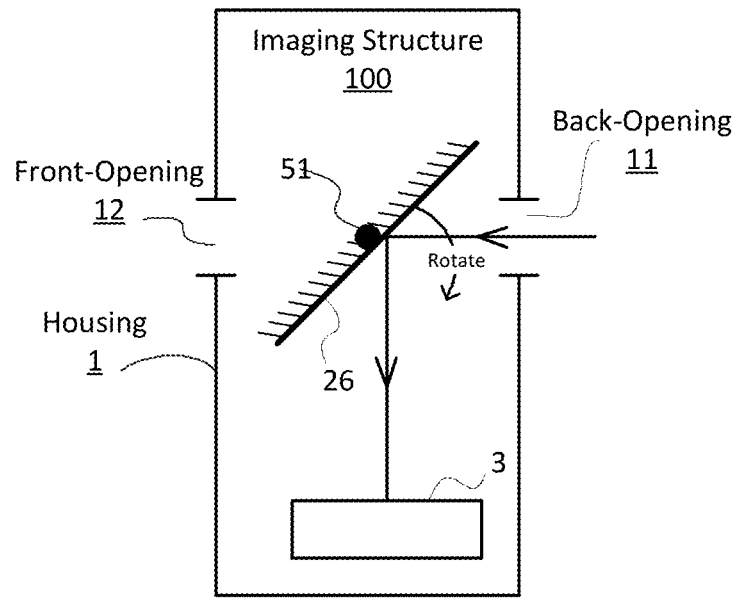
FIG. 9 shows a diagram illustrating an imaging structure configured with a single-reflective rotating module.

FIG. 9 shows a diagram illustrating an imaging structure configured with a single-reflective rotating module, in according to certain embodiments of the present disclosure. In comparison to the embodiments as illustrated in FIG. 7, the imaging structure 100 in FIG. 9 implements an alternative approach in utilizing a single set of photo-sensing module 3 to capture images from the front and back of a portable electronic device. The imaging structure 100 may utilize a single-reflective mirror 26 (which has one reflective surface on one of its sides) instead of a double-reflective mirror in its reflective module.

In a scenario as illustrated by FIG. 9, the reflective surface of the single-reflective mirror 26 may first face toward the back-opening 11, allowing light entering via the back-opening 11 to be reflected and travel on an optical path that is perpendicular to the entering light. The reflected light then passes through a lens group 40 (if any) before forming a focused image at the photo-sensing module 3. In this scenario, the image is captured from the back of the portable electronic device via the back-opening 11. To capture image from the front of the portable electronic device via the front-opening 12, the imaging structure 100 may adjust the rotation shaft 51, and turn the single-reflective mirror 26 90-degree right along the curved arrow indicated in FIG. 9, the result of which may be illustrated by FIG. 10.

Figure 10:
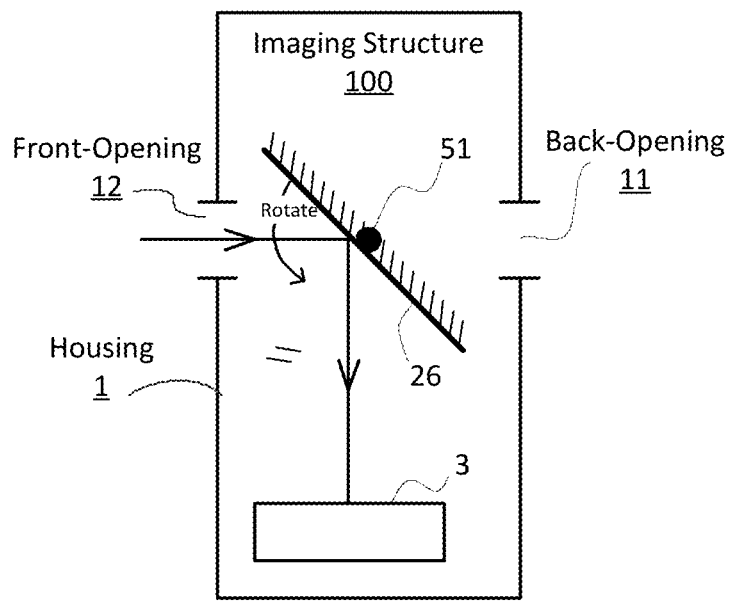
FIG. 10 shows a diagram illustrating an imaging structure after its single-reflective rotating module is rotated.

FIG. 10 shows a diagram illustrating an imaging structure after its single-reflective rotating module is rotated, in according to certain embodiments of the present disclosure. The imaging structure 100's single-reflective mirror 26 is rotated from a first position as illustrated in FIG. 9 to a second position as illustrated in FIG. 10. In FIG. 10's scenario, the reflective surface of the single-reflective mirror 26 may face toward the front-opening 12, allowing light entering via the front-opening 12 to be reflected and travel on an optical path that is perpendicular to the entering light. The reflected light then passes through the lens group 40 (if any) before forming a focused image on the photo-sensing module 3. In this scenario, the image is captured from the front of the portable electronic device via the front-opening 12. To return to the capturing of image from the back of the portable electronic device via the back-opening 11, the imaging structure 100 may adjust the rotation shaft 51, and turn the single-reflective mirror 26 90-degree left as indicated by the curved arrow in FIG. 10, the result of which may be illustrated by FIG. 9.

In some embodiments, the single-reflective mirror 26 may be rotated back-and-forth between the two incoming lights from the back-opening 11 and the front-opening 12. During such rotation, the reflective surface of the single-reflective mirror 26 may cut across the two incoming lights. In other words, the single-reflective mirror 26 may become parallel with the incoming lights, and one incoming light will be changed from illuminating one side of the single-reflective mirror 26 to illuminating its other side. Further, the reflective surface may be used to reflect lights entering either via the back-opening 11 or via the front-opening 12. Such rotating approach may require the thickness of the imaging structure 100 to be equal or larger than the width of the single-reflective mirror 26. In comparison, the double-reflective mirror as illustrated in FIGS. 7 and 8 does not need to cut across the incoming lights. Thus, the rotating approach as illustrated in FIGS. 7 and 8 may allow its imaging structure 100 to having a thickness that is substantially smaller than the width of its double-reflective mirror.

Figure 11:
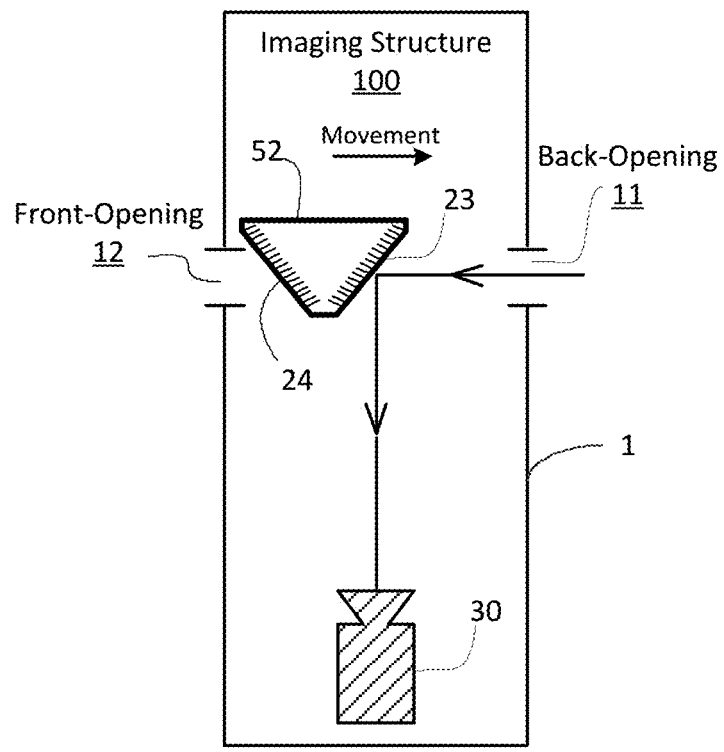
FIG. 11 shows a diagram illustrating an imaging structure configured with a multi-reflective switching module.

FIG. 11 shows a diagram illustrating an imaging structure configured with a multi-reflective switching module, in according to certain embodiments of the present disclosure. In FIG. 11, a portable electronic device may be implemented with an imaging structure 100 configured for easy adjustments of its optical path. The imaging structure 100 may have a back-opening 11 and a front-opening 12 for light inlet. The back-opening 11 and the front-opening 12 may be placed in accordance to the case-back-opening and case-front-opening of the portable electronic device. The imaging structure 100 may further have a multiple-reflective switching module 52, and a photo-sensing unit 30 which is constructed by combining a photo-sensing module with a lens group.

In some embodiments, the multi-reflective switching module 52 may be deemed the reflective module of the imaging structure 100, and may contain multiple "reflective parts" and a "switching mechanism." Each of the reflective parts may have a reflective surface configured to manipulate external lights. The switching mechanism may have various "switching positions" corresponding to the multiple reflective parts. To change to a particular switching position, the switching mechanism of the multi-reflective switching module 52 may move one of the reflective parts into an optical path. In other words, when being switched to a first switching position, the switching mechanism may place a corresponding first reflective part into the optical path. Similarly, by being switching from the first switching position to a second switching position, the switching mechanism may move the first reflective part out of the optical path, and move a second reflective part which corresponds to the second switching position into the optical path.

In FIG. 11's example, the multi-reflective switching module 52 may have a linear movement switching mechanism that can provide back-or-forth linear movement (as indicated by the arrow in FIG. 11). Specifically, the direction of the linear movement may be parallel to a portion of the optical path, e.g., the incoming lights from the back-opening 11 or the front-opening 12. The direction of the linear movement may also be perpendicular to the optical path between the multi-reflective switching module 52 and the photo-sensing unit 30. Further, the multi-reflective switching module 52 may include a first reflective part 23 and a second reflective part 24 that may move together with the multi-reflective switching module 52. The first reflective part 23 and a second reflective part 24 may be full-reflective mirrors or prisms, with their respective reflective surfaces positioned at an outer 270-degree angle.

In a scenario as illustrated by FIG. 11, the multi-reflective switching module 52 may be in a first switching position, in which the first reflective part 23 may be activated to reflect light entering from the back-opening 11 toward the photo-sensing unit 30. In other words, the first reflective part 23 is moved into the imaging structure 100's optical path, allowing light entering via the back-opening 11 to be reflected for 90-degree and travel along the optical path that is perpendicular to the entering light. In this scenario, the image is captured from the back of the portable electronic device via the back-opening 11. To capture image from the front of the portable electronic device via the front-opening 12, its moving mechanism may adjust the multi-reflective switching module 52 to a second switching position, by moving the multi-reflective switching module 52 to the right direction as indicated by the arrow in FIG. 11, the result of which may be illustrated by FIG. 12.

In certain embodiments, the first reflective part 23 and the second reflective part 24 may reflect lights from the back-opening 11 and front-opening 12 toward the same direction (the direction toward the photo-sensing unit 30). Alternatively, the first reflective part 23 and the second reflective part 24 may utilize different optical elements to provide a telephoto effect and the wide-angle effect. For example, the first reflective part 23 may be a concave mirror which can produce a telephoto effect, and the second reflective part 24 may be a convex mirror which can provide the wide-angle effect. In this case, lights reflected by the first reflective part 23 and the second reflective part 24 may have their respective directions.

Figure 12:
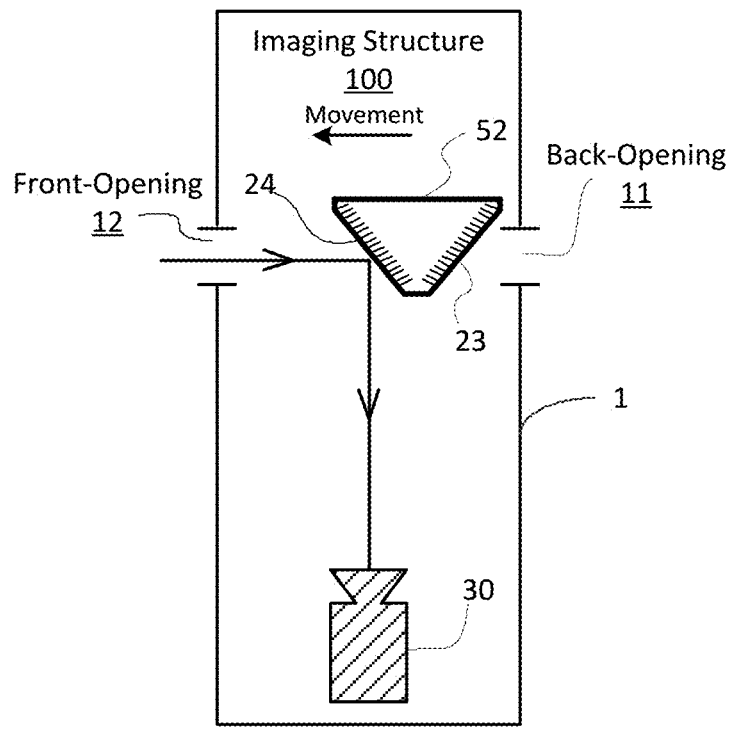
FIG. 12 shows a diagram illustrating an imaging structure after its multi-reflective switching module is switched to a different switching position.

FIG. 12 shows a diagram illustrating an imaging structure after its multi-reflective switching module is switched to a different switching position, in according to certain embodiments of the present disclosure. In FIG. 12's scenario, the imaging structure 100's multi-reflective switching module 52 is moved from the first switching position as illustrated in FIG. 11 to a second switching position as illustrated in FIG. 12. In this scenario, the first reflective part 23 can no longer reflect light entering through the back-opening and toward the photo-sensing module 30, since the first reflective part 23 is moved out of the imaging structure 100's optical path.

After switching position, the second reflective part 24 is moved into the imaging structure 100's optical path, allowing light entering via the front-opening 12 to be reflected for 90-degree and travel along the optical path that is perpendicular to the entering light, before forming a focused image at the photo-sensing module 30. In this scenario, the image is captured from the front of the portable electronic device via the front-opening 12. To capture image from the back of the portable electronic device via the back-opening 11, its moving mechanism may adjust the multi-reflective switching module 52 back to the first switching position, by moving the multi-reflective switching module 52 to the left direction as indicated by the arrow in FIG. 12, the result of which may be illustrated by FIG. 11.

Figure 13:
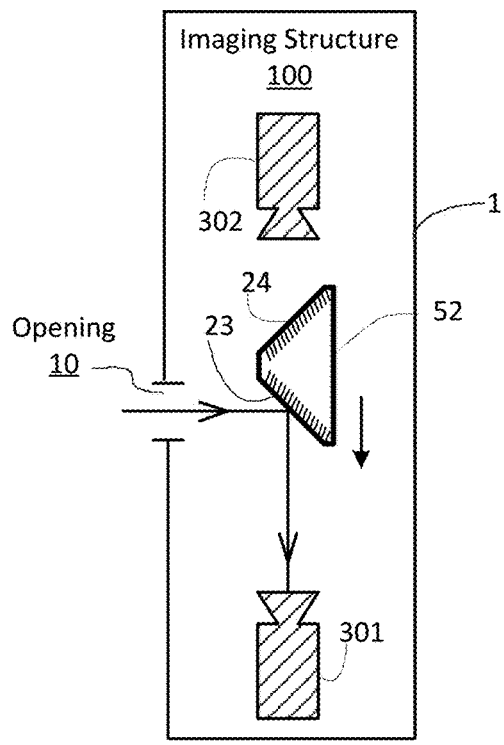
FIG. 13 shows a diagram illustrating an imaging structure configured with a multi-reflective switching module and multiple photo-sensing units.

FIG. 13 shows a diagram illustrating an imaging structure configured with a multi-reflective switching module and multiple photo-sensing units, in according to certain embodiments of the present disclosure. In FIG. 13, a portable electronic device may be implemented with an imaging structure 100 having one opening 10 for light inlet. The opening 10 may be placed in accordance to an opening of the portable electronic device. The imaging structure 100 may include a multi-reflective switching module 52, and two photo-sensing units 301 and 302. The multi-reflective switching module 52 may include a first reflective part 23 and a second reflective part 24, as well as a linear movement switching mechanism similar to the one described above.

In a scenario as illustrated by FIG. 13, the multi-reflective switching module 52 may be in a first switching position, in which the first reflective part 23 may reflect lights entering from the opening 10 toward the photo-sensing unit 301. In other words, the first reflective part 23 is moved into one of the imaging structure 100's optical paths, allowing light entering via the opening 10 to be reflected for 90-degree and travel along the optical path that is perpendicular to the entering light. In this scenario, the image is captured by the photo-sensing unit 301. To have the photo-sensing unit 302 capturing image, its moving mechanism may adjust the multi-reflective switching module 52 to a second switching position, causing the multi-reflective switching module 52 to be moved along the down direction as indicated by the arrow in FIG. 13, the result of which may be illustrated by FIG. 14. The first reflective part 23 and the second reflective part 24 may reflect lights from the opening 10 toward different directions (the direction toward the photo-sensing unit 301 and the opposite direction toward the photo-sensing unit 302), rather than toward the same direction as in the scenario illustrated in FIGS. 11 and 12.

Figure 14:
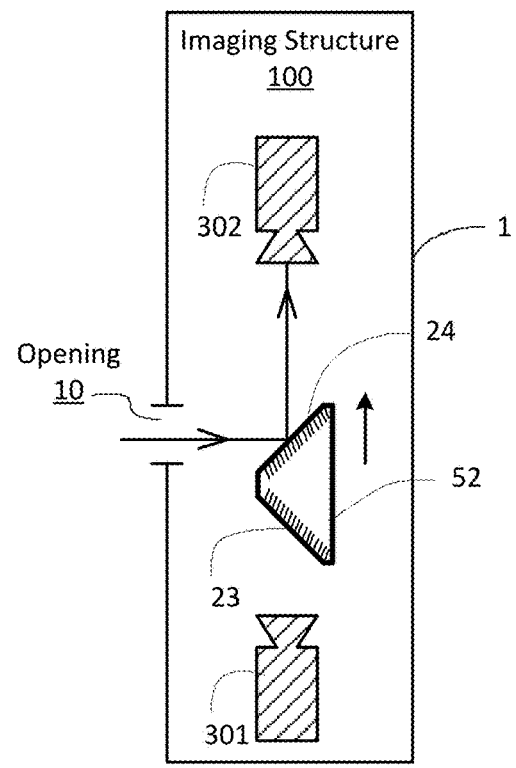
FIG. 14 shows a diagram illustrating an imaging structure after its multi-reflective switching module is switched to a different switching position.

FIG. 14 shows a diagram illustrating an imaging structure after its multi-reflective switching module is switched to a different switching position, in according to certain embodiments of the present disclosure. In FIG. 14's scenario, the imaging structure 100's multi-reflective switching module 52 is moved from the first switching position as illustrated in FIG. 13 to a second switching position as illustrated in FIG. 14. In this scenario, the first reflective part 23 can no longer reflect light entering through the opening 10 and toward the photo-sensing module 301, since the first reflective part 23 is moved out of the imaging structure 100's optical path.

After switching position, the second reflective part 24 is moved into the imaging structure 100's optical path, allowing light entering via the opening 10 to be reflected for 90-degree and travel along the optical path that is perpendicular to the entering light, before forming a focused image at the photo-sensing module 302. In this scenario, the image is captured by the photo-sensing unit 302. To have the photo-sensing unit 301 capturing image, its moving mechanism may adjust the multi-reflective switching module 52 to the first switching position, causing the multi-reflective switching module 52 to be moved along the up direction as indicated by the arrow in FIG. 14, the result of which may be illustrated by FIG. 13.

In some embodiments, the photo-sensing unit 301 and the photo-sensing unit 302 may be configured with different features and performances. For example, the photo-sensing units 301 and 302 may be configured with different focal lengths, pixel resolutions, or special effects. Similar to above, the first reflective part 23 and the second reflective part 24 may utilize different optical elements to provide a telephoto effect and the wide-angle effect. For example, the first reflective part 23 may be a concave mirror which can produce a telephoto effect, and the second reflective part 24 may be a convex mirror which can provide the wide-angle effect.

Figure 15:
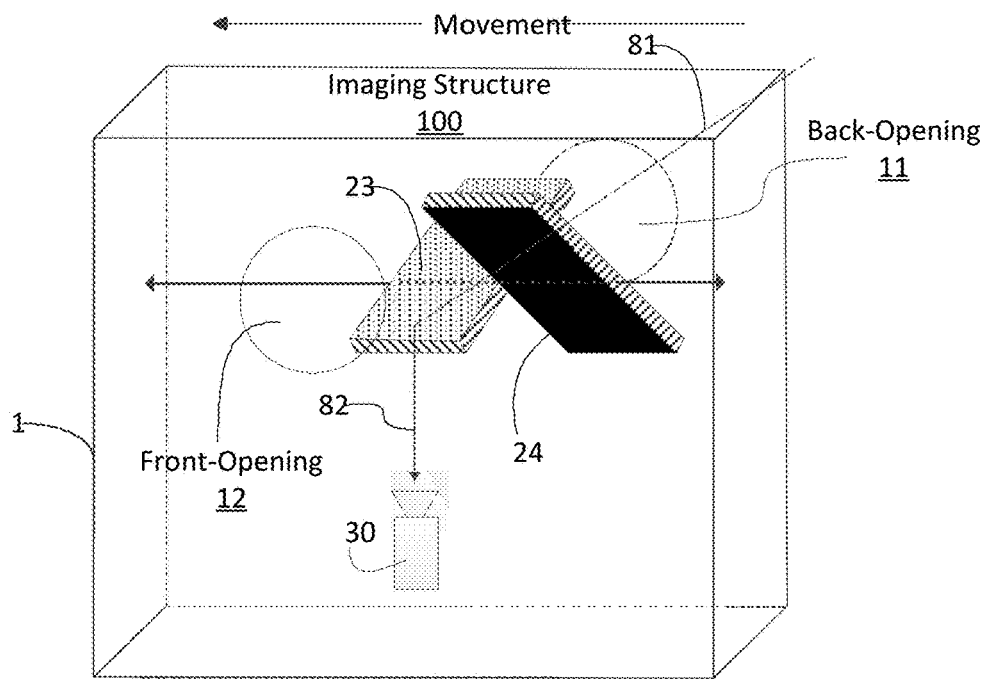
FIG. 15 shows a diagram illustrating an imaging structure configured with a multi-reflective switching module that moves in a different direction.

FIG. 15 shows a diagram illustrating an imaging structure configured with a multi-reflective switching module that moves in a different direction, in according to certain embodiments of the present disclosure. In FIG. 15, structure and modules marked by numbers may correspond to similar structure and modules marked by the same numbers in FIG. 11. Since in the imaging structure 100 of FIGS. 11 and 12 may require inner space to accommodate the multi-reflective switching module 52' movement, as a result, the imaging structure 100 of FIGS. 11 and 12 may become wider or thicker in one dimension. The imaging structure 100 of FIG. 15 or FIG. 16 may chance the movement direction of its multi-reflective switching module, so that the imaging structure 100 may save space in certain dimension. In other words, with respect to the imaging structure 100 of FIG. 11 or FIG. 12, its multi-reflective switching module 52's movement is in alliance with the thickness dimension of the imaging structure 100 or the portable electronic device. While in FIG. 15 and FIG. 16, the multi-reflective switching module's linear movement may be in alliance with the height or width of the imaging structure 100 or the portable electronic device.

In FIG. 15, the imaging structure 100 may have a back-opening 11 and a front-opening 12 for light inlet. The back-opening 11 and the front-opening 12 may be placed in accordance to the case-back-opening and case-front-opening of the portable electronic device. Further, the back-opening 11 and the front-opening 12 may share a common axis, meaning that both openings 11 and 12's axis overlap. Alternatively, the axis of the back-opening 11 does not overlap with the axis of the front-opening 12. The imaging structure 100 may further have a multiple-reflective switching module and a photo-sensing unit 30. The multi-reflective switching module may be deemed the reflective module of the imaging structure 100, and may contain multiple reflective parts and a switching mechanism.

In FIG. 15's example, the multi-reflective switching module may have a linear movement switching mechanism that can provide left-or-right linear movement (as indicated by the arrow in FIG. 15). The direction of the linear movement may be perpendicular to the incoming lights from the back-opening 11 or the front-opening 12, and perpendicular to the optical path between the multi-reflective switching module and the photo-sensing unit 30 as well. Further, the multi-reflective switching module may include a first reflective part 23 and a second reflective part 24 that may move together with the multi-reflective switching module. The first reflective part 23 and the second reflective part 24 may be full-reflective mirrors or prisms, with their respective reflective surfaces positioned at a 90-degree angle.

In a scenario as illustrated by FIG. 15, the multi-reflective switching module may be in a first switching position, in which the first reflective part 23 may reflect lights entering from the back-opening 11 toward the photo-sensing unit 30. In other words, the first reflective part 23 is moved into the imaging structure 100's optical path, allowing light entering via the back-opening 11 to be reflected for 90-degree and travel along the optical path that is perpendicular to the entering light. In this scenario, the image is captured from the back of the portable electronic device via the back-opening 11. To capture image from the front of the portable electronic device via the front-opening 12, its moving mechanism may adjust the multi-reflective switching module 52 to a second switching position, causing the multi-reflective switching module 52 to be moved to the left direction as indicated by the arrow in FIG. 15, the result of which may be illustrated by FIG. 16. The first reflective part 23 and the second reflective part 24 may reflect lights from the back-opening 11 and front-opening 12 toward the same direction (the direction toward the photo-sensing unit 30).

Figure 16:
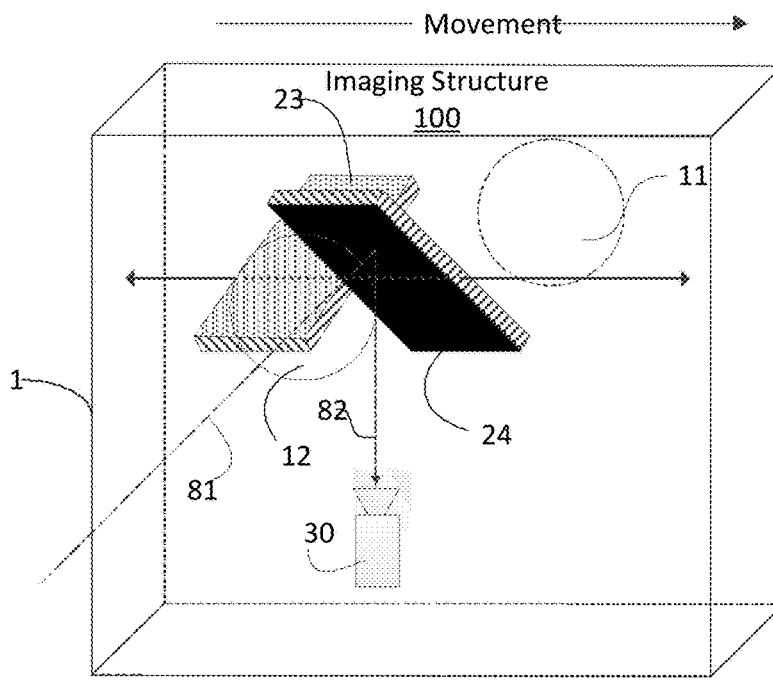
FIG. 16 shows a diagram illustrating an imaging structure after its multi-reflective switching module is switched to a different switching position by moving in a different direction.

FIG. 16 shows a diagram illustrating an imaging structure after its multi-reflective switching module is switched to a different switching position by moving in a different direction, in according to certain embodiments of the present disclosure. In FIG. 16's scenario, the imaging structure 100's multi-reflective switching module is moved from the first switching position as illustrated in FIG. 15 to a second switching position as illustrated in FIG. 16. In this scenario, the first reflective part 23 can no longer reflect light entering through the back-opening 11 and toward the photo-sensing module 30, since the first reflective part 23 is moved out of the imaging structure 100's optical path.

After switching position, the second reflective part 24 is moved into the imaging structure 100's optical path, allowing light entering via the front-opening 12 to be reflected for 90-degree and travel along the optical path that is perpendicular to the entering light, before forming a focused image on the photo-sensing module 30. In this scenario, the image is captured from the front of the portable electronic device via the front-opening 12. To capture image from the back of the portable electronic device via the back-opening 11, its moving mechanism may adjust the multi-reflective switching module back to the first switching position, causing the multi-reflective switching module 52 to be moved to the right direction as indicated by the arrow in FIG. 16, the result of which may be illustrated by FIG. 15.

Figure 17:
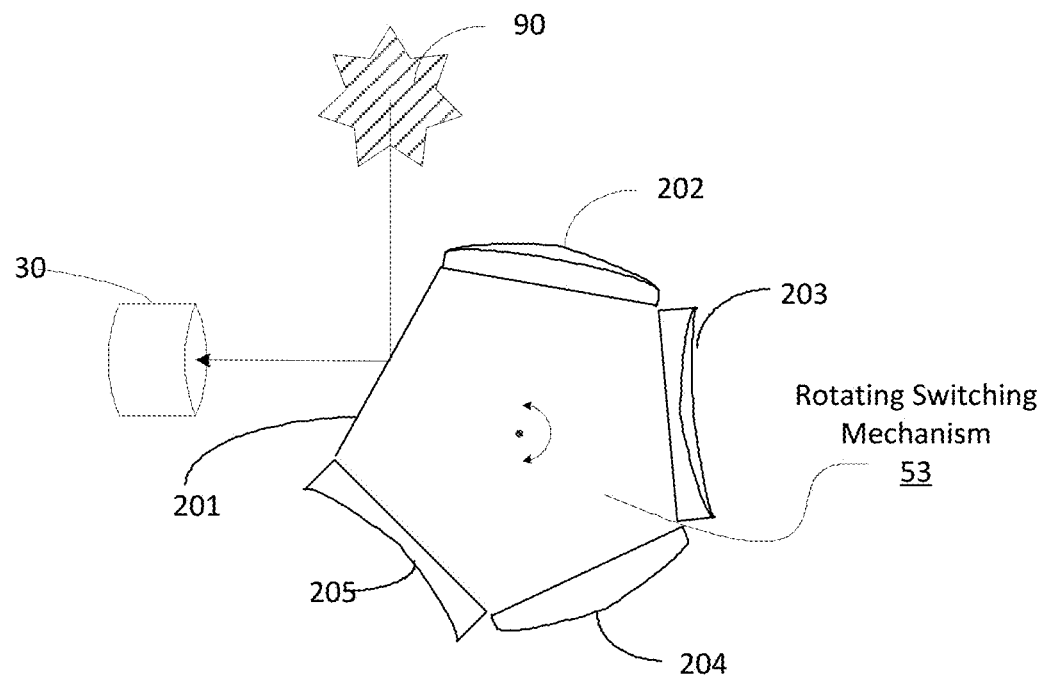
FIG. 17 shows a diagram illustrating a multi-reflective switching module having multiple reflective parts.

FIG. 17 shows a diagram illustrating a multi-reflective switching module having multiple reflective parts, in according to certain embodiments of the present disclosure. In FIG. 17, a portable electronic device may be implemented with an imaging structure including a multi-reflective switching module as its reflective module and a photo-sensing unit 30. The multi-reflective switching module may include multiple reflective parts (e.g., reflective parts 201, 202, 203, 204, and 205). The multi-reflective switching module 52 may further include a rotating switching mechanism 53 that can switch among multiple switching positions by rotating around a rotation axis.

In some embodiments, the rotation axis of the multi-reflective switching module 52 may be perpendicular to the incoming light from a distance shooting object 90, and perpendicular to the optical path between the multi-reflective switching module and the photo-sensing unit 30. The rotating switching mechanism 53 may adjust the multi-reflective switching module from one switching position to another switching position by rotating back-or-forth around the rotation axis for a certain degrees (as indicated by a curved arrow in FIG. 17). When switched to a certain switching position, the multi-reflective switching module may utilize one of the reflective parts to manipulate the light from the distance shooting object 90 and traveling along the optical path.

In the scenario as shown in FIG. 17, the rotating switching mechanism 53 may have a pentagon cross-sectional shape. In other words, the rotating switching mechanism 53 may have five side surfaces for installing a first reflective part 201, a second reflective part 202, a third reflective part 203, a fourth reflective part 204, and a fifth reflective part 205. Each of the above reflection parts may provide different types of light manipulations. For example, the first reflective part 201 may be a flat mirror; the second reflecting part 202 may be a spherical convex mirror; the third reflecting part 203 may be a concave paraboloid reflector; the fourth reflecting part 204 may be a plano-curved convex mirror; and the fifth reflecting part 205 may be a plano-curved concave mirror. When the portable electronic device needs to provide a certain image outcome, it may utilize the rotating switching mechanism 53 to place a particular reflective part onto the optical path, thereby creating the necessary optical effects (e.g., a wide-angle effect).

In some embodiments, the multi-reflective switching module having the rotating switching mechanism 53 may be implemented as the reflective modules of the imaging structures in FIGS. 7-16. Specifically, some of the reflective parts in the rotating switching mechanism 53 may also be implemented as the reflective parts for embodiments shown in FIGS. 7-16. Alternatively, additional reflective parts may be added onto the linear movement switch mechanisms of FIGS. 7-16, to create more optical effects.

Figure 18:
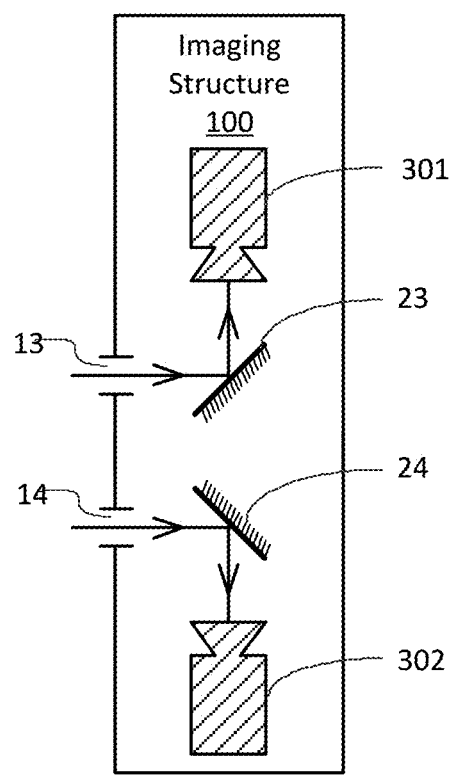
FIG. 18 shows a diagram illustrating a first imaging structure that supports 3D image creation.

FIG. 18 shows a diagram illustrating a first imaging structure that supports 3D image creation, in according to certain embodiments of the present disclosure. In FIG. 18, a portable electronic device may be implemented with an imaging structure 100 configured with a first opening 13 and a second opening 14 for light inlet. The first opening 13 and the second opening 14 may be placed in accordance to the case-back-opening and case-front-opening of the portable electronic device. The imaging structure 100 may further have a first reflective module 23 and a second reflective module 24, as well as two corresponding photo-sensing units 301 and 302.

A human's ability to observe three-dimensional (3D) image information is mainly due to human' two eyes being separated by a distance (e.g., about 60-65 mm) and facing a common direction. When a human is looking at a specific object, his left eye may see an image that is slightly different from the image perceived by his right eye, as the left eye's viewing angle is different from the right eye's viewing angle. The human's brain may then "combine" these two images into a 3D image. In some embodiments, the imaging structure 100 may imitate human's 3D image processing capability by having the first opening 12 and the second opening 14 acting as human's two eyes.

In some embodiments, to imitate human's two eyes, the first opening 13 and the second opening 14 of the imaging structure 100 may be positioned to face a common direction. The first opening 13 and the second opening 14 may be separated by a certain distance, so that images captured through these two openings may have different viewing angles. Further, light passing through the first opening 13, being reflected by the first reflective module 23, before being captured by the photo-sensing unit 301 may be deemed on a first optical path, while light passing through the second opening 14, being reflected by the second reflective module 24, before being captured by the photo-sensing unit 302 may be deemed on a second optical path.

In other words, the first reflective module 23 may be placed behind the first opening 13, in order to reflect light from the first opening 13 toward the photo-sensing unit 301; and the second reflective module 24 may be placed behind the second opening 14, in order to reflect light from the second opening 14 toward the photo-sensing unit 302. The direction of the light being reflected by the first reflective module 23 and the direction of the light being reflected by the second reflective module 24 may be opposite to each other. Further, the reflective surface of the first reflective module 23, and the reflective surface of the second reflective module 24, may be facing away from each other and positioned at an outer 270-degree angle. Thus, the images captured by the photo-sensing units 301 and 302 may be used to generate 3D effects.

Figure 19:
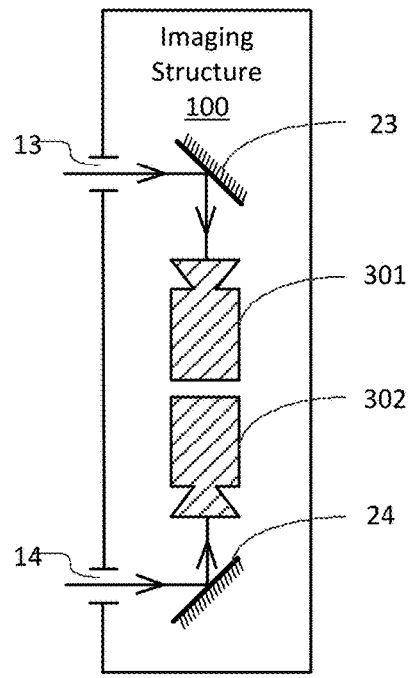
FIG. 19 shows a diagram illustrating a second imaging structure that supports 3D image creation.

FIG. 19 shows a diagram illustrating a second imaging structure that supports 3D image creation, in according to certain embodiments of the present disclosure. In FIG. 19, a portable electronic device may be implemented with an imaging structure 100 configured with a first opening 13 and a second opening 14 for light inlet. The first opening 13 and the second opening 14 may be placed in accordance to the case-back-opening and case-front-opening of the portable electronic device. The imaging structure 100 may further have a first reflective module 23 and a second reflective module 24, as well as two corresponding photo-sensing units 301 and 302.

In some embodiments, the differences between the imaging structure 100 of FIG. 19 and the imaging structure 100 of FIG. 18 is that: in FIG. 19, the imaging structure 100 may have its two photo-sensing units 301 and 302 positioned together between the first reflective module 23 and the second reflective module 24. While in FIG. 18, the imaging structure 100 may have its two photo-sensing units 301 and 302 positioned at two of its ends, with the first reflective module 23 and the second reflective module 24 being in between. Further, in FIG. 19, the reflective surface of the first reflective module 23, and the reflective surface of the second reflective module 24, may be facing toward each other and positioned at a 90-degree angle. While in FIG. 18, the reflective surface of the first reflective module 23, and the reflective surface of the second reflective module 24, may be facing away from each other and positioned at an outer 270-degree angle.

In some embodiments, with respect to the imaging structure 100 in FIG. 18 and FIG. 19, the first reflective module 23 and the second reflective module 24 may utilize reflection parts including full-reflective mirror or prism, semi-reflective mirror, concave mirror, convex mirror, or any mirror with various curved surface. Additional linear movement switching mechanism as well as rotating switching mechanism described above may also be combined with the reflective modules 23 and 24 to achieve different optical results or to enable wide-angle, telephoto, and other various optical effects in 3D imaging.

Figure 20:
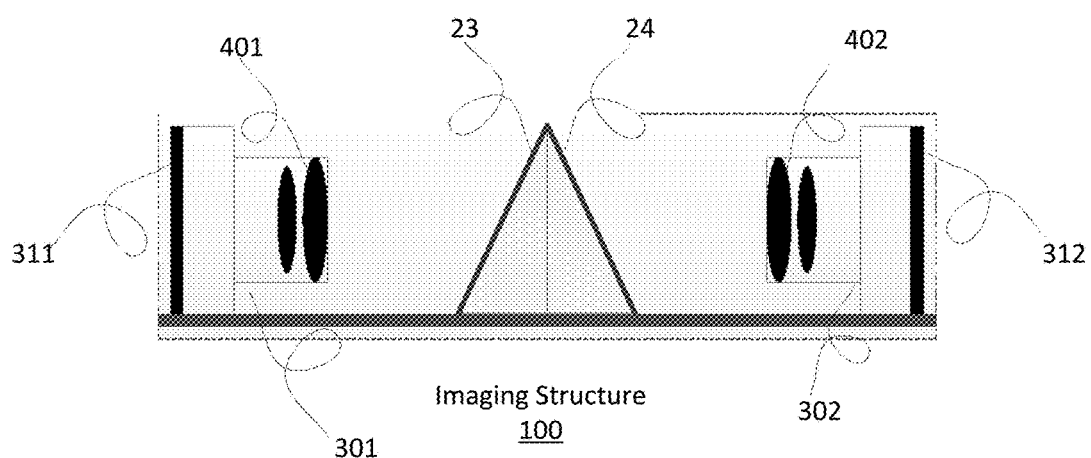
FIG. 20 shows a diagram illustrating an imaging structure that can create an extended viewing angle.

FIG. 20 shows a diagram illustrating an imaging structure that can create an extended viewing angle, in according to certain embodiments of the present disclosure. In FIG. 20, a portable electronic device may be implemented with an imaging structure 100 having a first reflective module 23 and a second reflective module 24. The imaging structure 100 may further contain a first photo-sensing unit 301 and a second photo-sensing unit 302. The first photo-sensing unit 301 may include a first lens group 401 and a first photo-sensing module 311, and the second photo-sensing unit 302 may include a second lens group 402 and a second photo-sensing module 312.

In some embodiments, the multiple photo-sensing units 301 and 302 with their respective reflective modules 23 and 24 may be configured to extend the imaging structure 100's viewing angle. Specifically, the imaging structure 100 may have one opening corresponding to an opening placed on the surface of the portable electronic device. Alternatively, the imaging structure 100 may have two openings, which are positioned very close to each other, corresponding to two respective openings placed on the surface of the portable electronic device. Two openings positioned close to each other may have substantially the same effect as a single larger opening with respect to light inlet.

In some embodiments, the first reflective module 23 and the second reflective module 24 may be placed back to back, with their respective reflective surfaces facing away from each other and forming an angle (e.g., 90-degree or less). Thus, a single light beam hitting both the first reflective module 23 and the second reflective module 24 may be reflected into two opposite beams toward the two photo-sensing units respectively. The two images captured by the two photo-sensing units may be processed into a combined image. The combined image may have a wider viewing angle and a broader perspective than any one of the two images captured by the two photo-sensing units.

Figure 28:
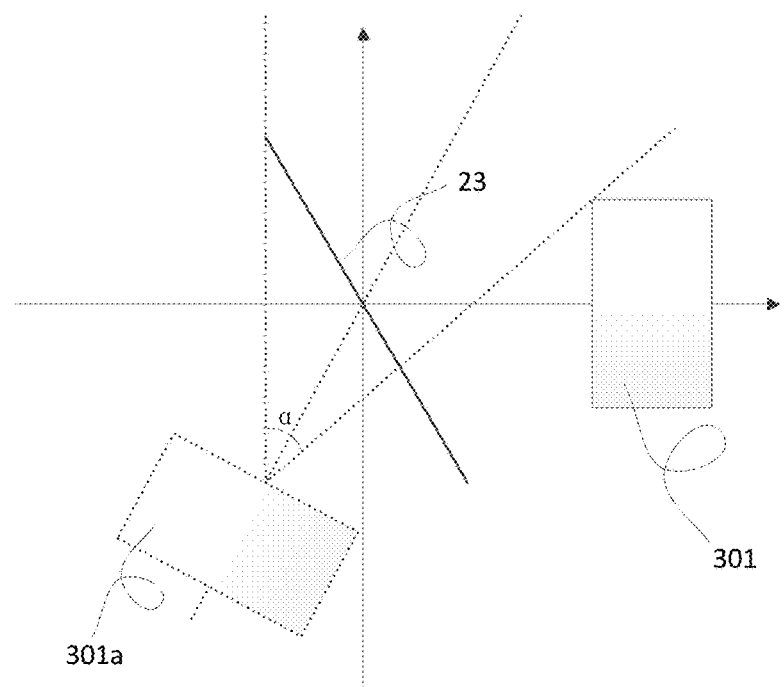
FIG. 28 shows a diagram illustrating a photo-sensing unit associated with an imaging structure that can create an extended viewing angle.

FIG. 28 shows a diagram illustrating a photo-sensing unit associated with an imaging structure that can create an extended viewing angle, in according to certain embodiments of the present disclosure. In FIG. 28, the reflective module 23 and the photo-sensing unit 301 may correspond to the respective module and lens group having the same number in FIG. 20. The reflective module 23 may reflect light toward the photo-sensing unit 301. Based on the reflection theory, the photo-sensing unit 301 may be seen as if it were located at the position of photo-sensing unit 301a, which is symmetry to the photo-sensing unit 301 with respect to the reflective surface of the reflective module 23. Thus, the view angle of the photo-sensing unit 301 may be evaluated by examining the viewing angle α of the imagery photo-sensing unit 301a.

Figure 29:
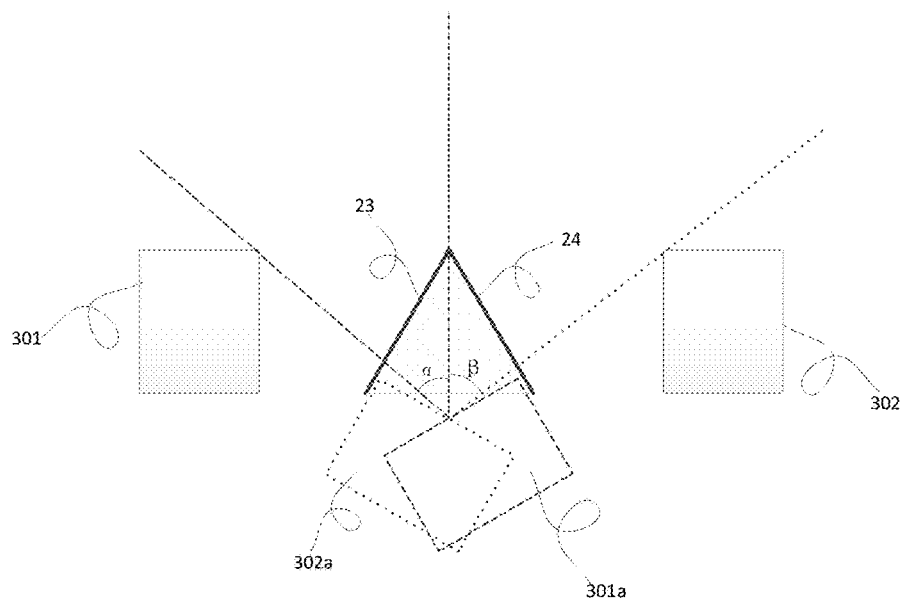
FIG. 29 shows a diagram illustrating two photo-sensing units associated with an imaging structure that can create an extended viewing angle.

FIG. 29 shows a diagram illustrating two photo-sensing units associated with an imaging structure that can create an extended viewing angle, in according to certain embodiments of the present disclosure. In FIG. 29, the reflective module 23, the reflective module 24, the photo-sensing unit 301, and the photo-sensing unit 302 may correspond to the respective modules and lens groups having the same number in FIG. 20. The reflective module 23 may reflect light toward the photo-sensing unit 301, and the reflective module 24 may reflect light toward the photo-sensing unit 302. Based on the reflection theory, the photo-sensing unit 301 may be seen as if it were located at the position of photo-sensing unit 301a, which is symmetry to the photo-sensing unit 301 with respect to the reflective surface of the reflective module 23. Similarly, the photo-sensing unit 302 may be seen as if it were located at the position of photo-sensing unit 302a, which is symmetry to the photo-sensing unit 302 with respect to the reflective surface of the reflective module 24. Thus, the view angle of the photo-sensing unit 301 may be evaluated by examining the viewing angle α of the imagery photo-sensing unit 301a, and the view angle of the photo-sensing unit 302 may be evaluated by examining the viewing angle β of the imagery photo-sensing unit 302a.

In some embodiments, the reflective module 23 and the reflective module 24 may be positioned back-to-back next to each other, so that the viewing angle α of the imagery photo-sensing unit 301a and the viewing angle β of the imagery photo-sensing unit 302a may be combined into an extended viewing angle for the imaging structure 100 of FIG. 20. With the right positioning of the reflective module 23 and the reflective module 24, the two viewing angles α and β may be combined with no overlapping or blind spots.

Figure 30:
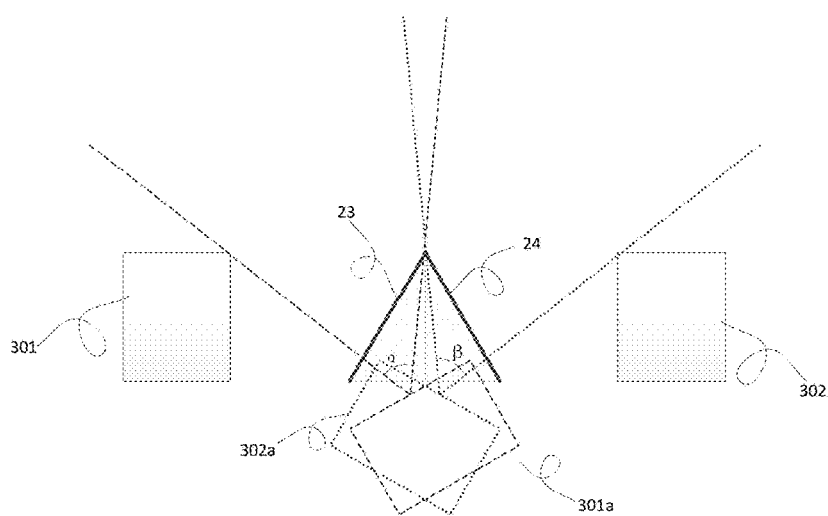
FIG. 30 shows a diagram illustrating two photo-sensing units associated with an imaging structure that can create an extended viewing angle with overlaps.

FIG. 30 shows a diagram illustrating two photo-sensing units associated with an imaging structure that can create an extended viewing angle with overlaps, in according to certain embodiments of the present disclosure. In FIG. 30, the reflective module 23, the reflective module 24, the photo-sensing unit 301, and the photo-sensing unit 302 may correspond to the respective modules and lens groups having the same number in FIG. 20 and FIG. 29. Compared to FIG. 29, the reflective module 23 and the reflective module 24 may be positioned in such a way, that the two viewing angles α and β may be combined with some overlapping areas. In some embodiments, an image processor may perform post-processing of the two images obtained via the photo-sensing units 301 and 302, identifying the overlapping areas in these two images, and generating a combined image with no overlapping areas and wider viewing angle.

Figure 21:
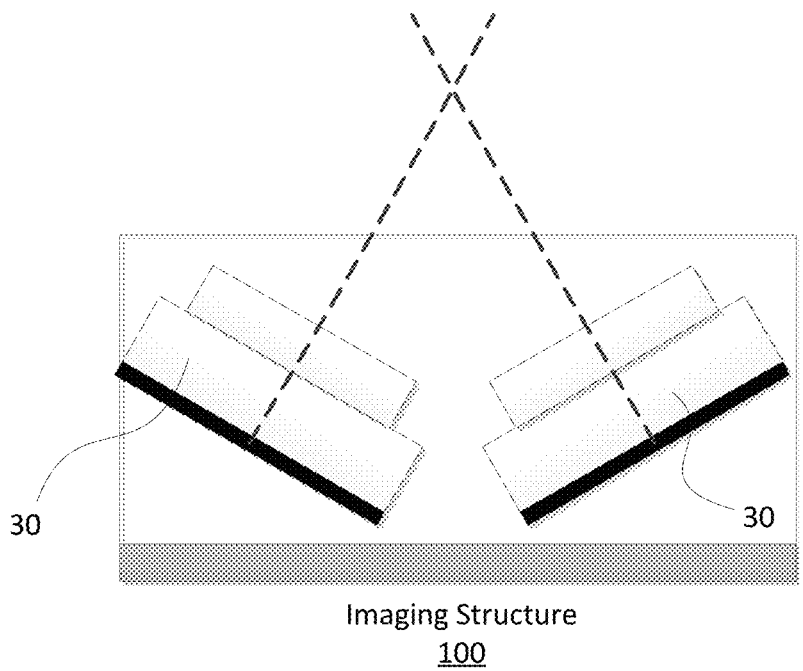
FIG. 21 shows a diagram illustrating two photo-sensing units tilting toward each other.

FIG. 21 shows a diagram illustrating two photo-sensing units tilting toward each other, in according to certain embodiments of the present disclosure. In FIG. 21, two photo-sensing units 30 may be positioned side by side and tilt toward each other. Thus, two images created by these two photo-sensing units 30 may have their respective viewing angles overlapping in certain areas. In other words, a combined image generated based on these two images may have overlapping areas.

Figure 22:
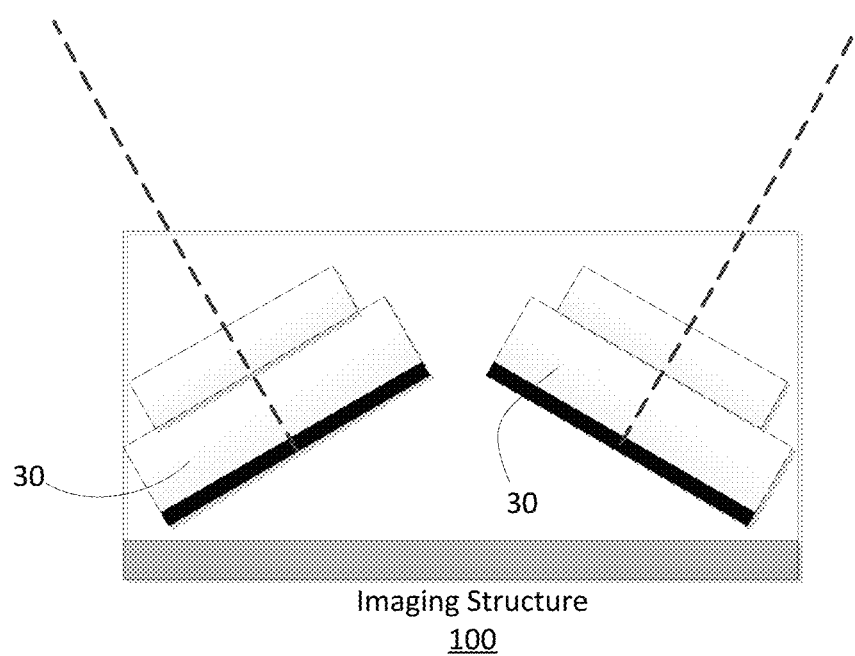
FIG. 22 shows a diagram illustrating two photo-sensing units tilting away from each other.

FIG. 22 shows a diagram illustrating two photo-sensing units tilting away from each other, in according to certain embodiments of the present disclosure. In FIG. 22, two photo-sensing units 30 may be positioned side by side and tilt away from each other. Thus, images created by these two photo-sensing units 30 may have no overlapping viewing angles. However, a combined image generated based on these two images may have blind spots.

In some embodiments, tilting the photo-sensing units 30 in FIG. 21 and FIG. 22 may increase the thickness of the imaging structure the photo-sensing units 30 contained therein, as a tilted photo-sensing unit 30 may have a greater height than the height of an un-tilted photo-sensing unit 30. The greater height may either ultimately lead to increasing the thickness of the portable electronic device, or lead to the imaging structure being designed to stick out of the surface of the portable electronic device. In comparison, the photo-sensing unit 301 and 302 of FIG. 20, which are positioned sideway without tilting, may have a less height than the photo-sensing units 30 of the FIGS. 21 and 22.

Figure 23:
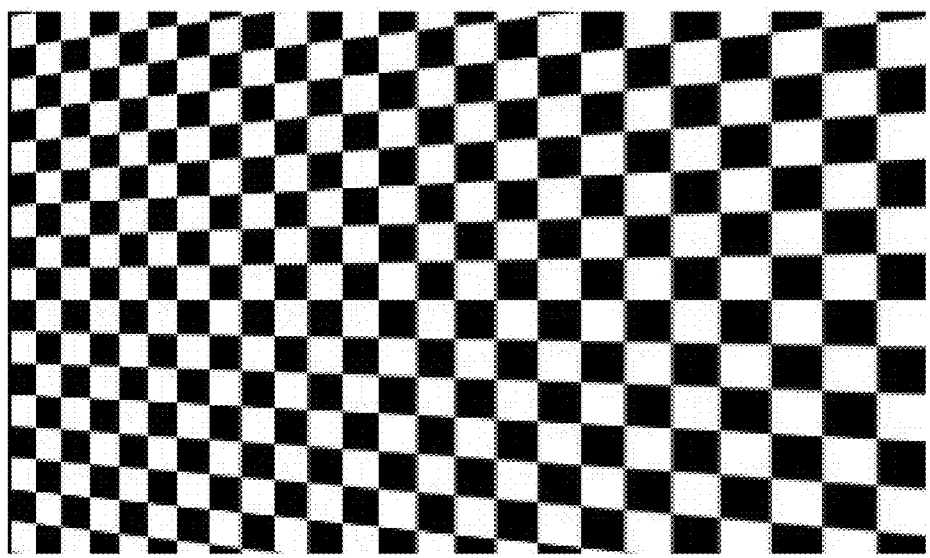
FIG. 23 illustrates an image captured by a left photo-sensing unit of an imaging structure that can create an extended viewing angle.
Figure 24:
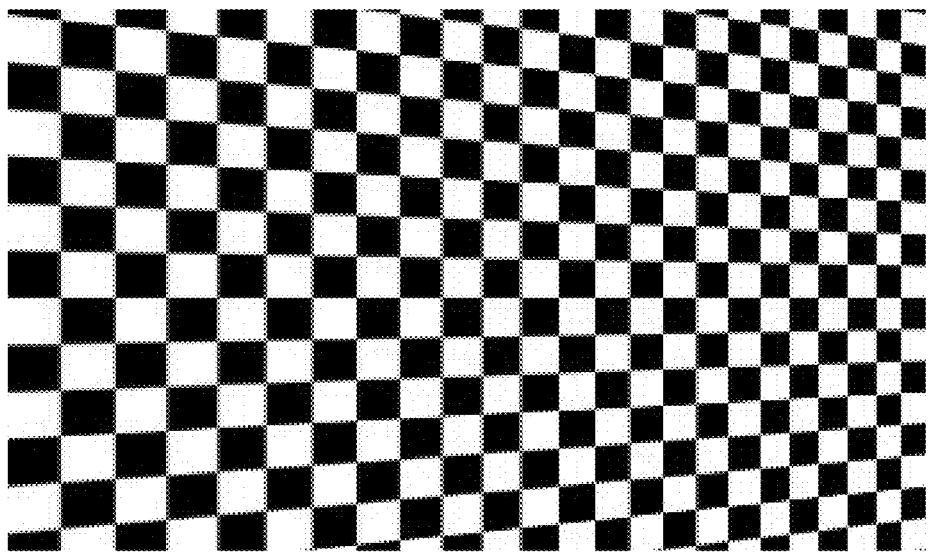
FIG. 24 illustrates an image captured by a right photo-sensing unit of an imaging structure that can create an extended viewing angle.
Figure 25:
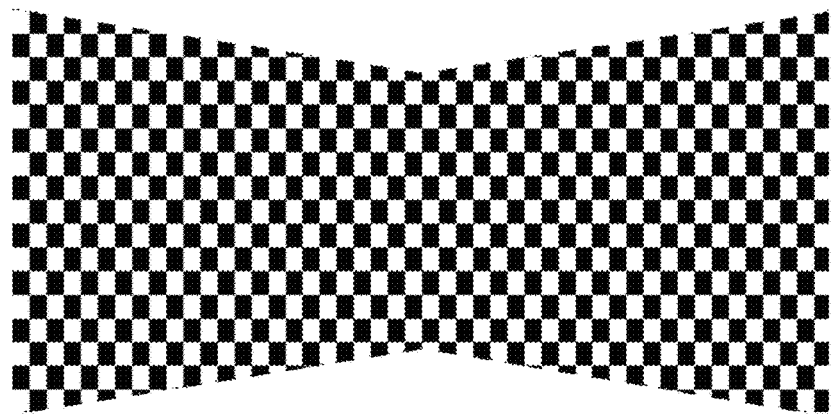
FIG. 25 illustrates an image created by combining two images.

FIG. 23 illustrates an image captured by a left photo-sensing unit of an imaging structure that can create an extended viewing angle. FIG. 24 illustrates an image captured by a right photo-sensing unit of an imaging structure that can create an extended viewing angle. And FIG. 25 illustrates an image created by combining two images. Specifically, the image of FIG. 23 may be captured and generated by photo-sensing unit 301 of FIG. 20. The photo-sensing unit 301's viewing angle may have a perspective effect on the image of FIG. 23. In other words, the image of FIG. 23 may have compression on its left side and/or stretching on its right side.

Similarly, the image of FIG. 24 may be captured and generated by photo-sensing unit 302 of FIG. 20. The photo-sensing unit 302's viewing angle may have a perspective effect on the image of FIG. 24. In other words, the image of FIG. 24 may have compression on its right side and/or stretching on its left side. During combining the image in FIG. 23 and the image of FIG. 24, a post-processor may identify the stretching and compression in these images by matching the pixels between these two images. Afterward, the post-processor may implement necessary stretching and compression to generate a combined image as shown in FIG. 25. As a result, the image of FIG. 25, even though no longer being rectangular, may have less stretching and compression, compared to the images of FIGS. 23 and 24.

Figure 26:
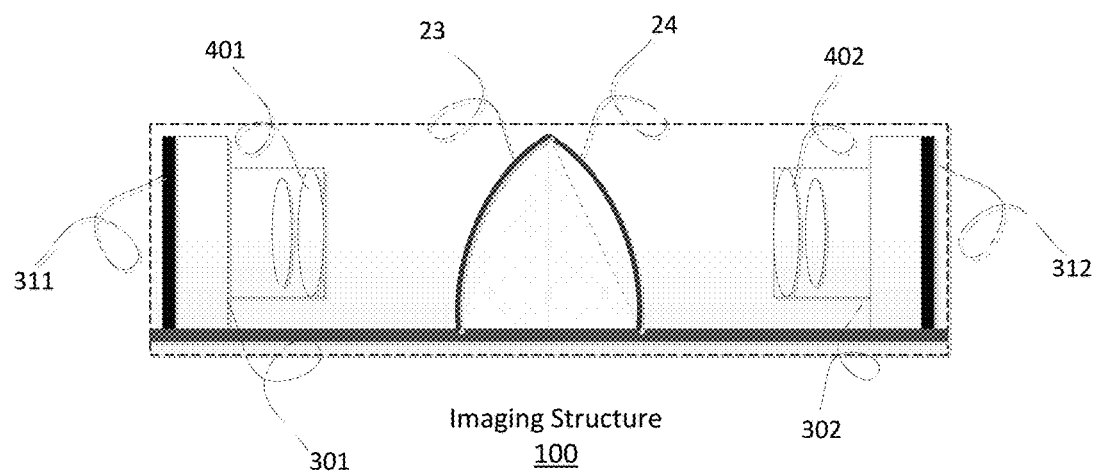
FIG. 26 shows a diagram illustrating an imaging structure that utilizes various reflective parts to create an extended viewing angle.

FIG. 26 shows a diagram illustrating an imaging structure that utilizes various reflective parts to create an extended viewing angle, in according to certain embodiments of the present disclosure. In FIG. 26, a portable electronic device may be implemented with an imaging structure 100 having a first reflective module 23 and a second reflective module 24. The imaging structure 100 may further contain a first photo-sensing unit 301 and a second photo-sensing unit 302. The first photo-sensing unit 301 may include a first lens group 401 and a first photo-sensing module 311, and the second photo-sensing unit 302 may include a second lens group 402 and a second photo-sensing module 312.

Compared to their respective counter parts in FIG. 20, the first reflective module 23 and the second reflective module 24 in FIG. 26 may utilize reflection parts including full-reflective mirror, full-reflective prism, semi-reflective mirror, concave mirror, convex mirror, or any mirror with various curved surface. Additional linear movement switching mechanism as well rotating switching mechanism described above may also be combined with the reflective modules 23 and 24 to achieve different results or to enable wide-angle, telephoto, and other various optical effects into 3D imaging.

In FIG. 26's example, the first reflective module 23 and the second reflective module 24 may utilize convex mirrors as their reflection parts, in order to achieve wider viewing angles in 3D shooting. Alternatively, the first reflective module 23 and the second reflective module 24 may be multi-reflective switching modules having linear movement switching mechanisms. In this case, a first reflective part and a second reflective part, which may be positioned side-by-side and facing away from each other, may form a first reflective group in a similar fashion as the first reflective module 23 and the second reflective module 24 of FIG. 20 being positioned. Likewise, a third reflective part and a fourth reflective part, which may be positioned side-by-side and facing away from each other, may form a second reflective group in a similar fashion as the first reflective group. These two reflective groups may then be placed on the linear movement switching mechanism, allowing easy switching between these two reflective groups as illustrated above in FIGS. 11-16. Alternatively, the first reflective module 23 and the second reflective module 24 may be multi-reflective switching modules having rotating switching mechanisms, similar to the one shown in FIG. 17.

Figure 27:
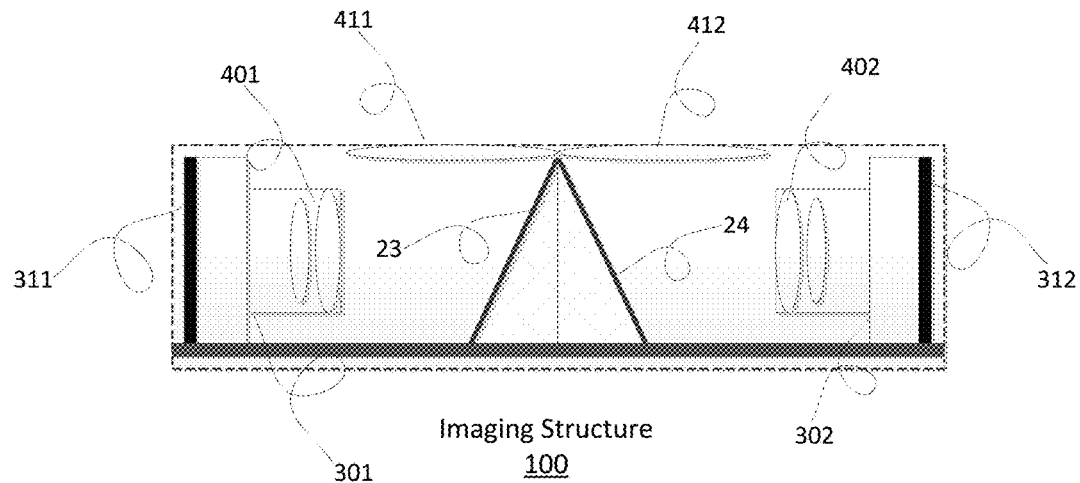
FIG. 27 shows a diagram illustrating an imaging structure that utilizes additional optical parts to create an extended viewing angle.

FIG. 27 shows a diagram illustrating an imaging structure that utilizes additional optical parts to create an extended viewing angle, in according to certain embodiments of the present disclosure. In FIG. 27, a portable electronic device may be implemented with an imaging structure 100 having a first reflective module 23 and a second reflective module 24. The imaging structure 100 may further contain a first photo-sensing unit 301 and a second photo-sensing unit 302. The first photo-sensing unit 301 may include a first lens group 401 and a first photo-sensing module 311, and the second photo-sensing unit 302 may include a second lens group 402 and a second photo-sensing module 312.

In some embodiments, to further achieve various optical effects, the imaging structure 100 may have a first lens 411 and a second lens 412 placed before the reflective module 23 and the reflective module 24 on their respective optical paths. In other words, the first lens 411 may be placed behind an opening from which light are directed to the reflective module 23, and lights passing through the opening may first be refracted by the lens 411 before reaching the reflective module 23. Likewise, the second lens 412 may be placed behind an opening from which light are directed to the reflective module 24, and lights passing through the opening may first be refracted by the lens 412 before reaching the reflective module 24. Thus, when the lens 411 and lens 412 are convex lenses, the imaging structure 100 may achieve a telephoto effect; when the lenses 411 and 412 are concave lenses, the imaging structure 100 may achieve a wide-angle effect; and when the lenses 411 and 412 are filters, the imaging structure 100 may achieve a filtering effect.

Systems and methods for imaging structures have been disclosed. The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like. One or more embodiments of the present disclosure may be implemented as one or more computer programs or as one or more computer program modules embodied in one or more computer readable media. The term computer readable storage medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, modules and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. An imaging structure for a portable electronic device, comprising:

a housing with a first opening for obtaining a first external light, and a second opening for obtaining a second external light, wherein the first opening and the second opening are located on a same surface of the housing facing a same direction;

a reflective module coupled with the housing, wherein the reflective module includes a first reflective surface for reflecting the first external light and a second reflective surface for reflecting the second external light;

a first photo-sensing module coupled with the reflective module, wherein the first photo-sensing module is configured to generate a first image based on the first external light reflected from the first reflective surface toward the photo-sensing module; and a second photo-sensing module coupled with the reflective module, wherein the second photo-sensing module is configured to generate a second image based on the second external light reflected from the second reflective surface toward the photo-sensing module.

2. The imaging structure as recited in claim 1, wherein the first reflective surface or the second reflective surface is a concave mirror.

3. The imaging structure as recited in claim 2, wherein the concave mirror has a plane-curved surface, causing the first image or the second image being stretched in one direction.

4. The imaging structure as recited in claim 1, wherein the first reflective surface or the second reflective surface is a convex mirror.

5. The imaging structure as recited in claim 4, wherein the convex mirror has a plane-curved surface, causing the first image or the second image being compressed in one direction.

6. The imaging structure as recited in claim 1, further comprising:

a lens coupled with the reflective module and the photo-sensing module, wherein the lens refracts the first external light or the second external light reflected from the reflective module toward the first photo-sensing module or the second photo-sensing module.

* * * * *